(12) United States Patent
Sharar et al.

(10) Patent No.: US 12,071,583 B2
(45) Date of Patent: Aug. 27, 2024

(54) SOLID STATE MARTENSITIC TRANSFORMATION PHASE CHANGE MATERIAL COMPONENTS FOR THERMAL ENERGY STORAGE AND TRANSIENT HEAT TRANSFER SYSTEMS

(71) Applicant: U.S. Army Combat Capabilities Development Command, Army Research Laboratory, Adelphi, MD (US)

(72) Inventors: Darin J. Sharar, Silver Spring, MD (US); Ronald Warzoha, Severna Park, MD (US); Brian Donovan, Annapolis, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 706 days.

(21) Appl. No.: 16/910,652

(22) Filed: Jun. 24, 2020

(65) Prior Publication Data
US 2020/0407615 A1 Dec. 31, 2020

Related U.S. Application Data

(60) Provisional application No. 62/867,024, filed on Jun. 26, 2019.

(51) Int. Cl.
*C09K 5/14* (2006.01)
*C09K 5/06* (2006.01)
*F28D 20/02* (2006.01)

(52) U.S. Cl.
CPC ............ *C09K 5/14* (2013.01); *C09K 5/063* (2013.01); *F28D 20/02* (2013.01)

(58) Field of Classification Search
CPC ............ C09K 5/14; C09K 5/063; C09K 5/02; F28D 20/02; F28D 20/0056; Y02E 60/14
See application file for complete search history.

(56) References Cited

U.S. PATENT DOCUMENTS

| | | | | |
|---|---|---|---|---|
| 3,174,851 A | * | 3/1965 | Buchler | C22F 1/006 337/140 |
| 4,036,669 A | * | 7/1977 | Brook | C22F 1/006 148/563 |

(Continued)

FOREIGN PATENT DOCUMENTS

| | | |
|---|---|---|
| EP | 0722997 A2 | 7/1996 |
| JP | 4485458 B2 * | 6/2010 |

OTHER PUBLICATIONS

N. Jankowski and F. McCluskey, "A review of phase change materials for vehicle component thermal buffering," Applied Energy, vol. 113, pp. 1525-1561, 2014.

(Continued)

*Primary Examiner* — Tho V Duong
(74) *Attorney, Agent, or Firm* — Eric B. Compton

(57) ABSTRACT

A heat exchange component includes a part configured for exchanging thermal energy, the part is formed of at least one solid state Martensitic transformation phase change material which is configured to readily undergo a solid-solid martensitic transformation from one crystalline structure to another different crystalline structure during a change in temperature in the normal and/or anticipated operating temperatures of the heat exchange component. In some embodiments, the system further includes a temporally-evolving external temperature/heat source which changes the temperature and resultant phase of the solid-state phase change material. The temporally-evolving external temperature/heat source may involve a solid conducting material or electronic/photonic component, a fluid, a plasma, and/or a (Continued)

radiation source. The heat exchange component may be configured as a flat plate, tube, finned structure, porous structure, graded structure, cold plate, heat exchanger, condenser, evaporator, or any component generally regarded as a thermal energy storage or heat transfer structure in various embodiments.

24 Claims, 15 Drawing Sheets

(56) References Cited

U.S. PATENT DOCUMENTS

| | | | |
|---|---|---|---|
| 4,795,580 | A | 1/1989 | Hormansdorfer |
| 5,785,885 | A | 7/1998 | Kakiuchi et al. |
| 6,557,993 | B2 | 5/2003 | Rossin |
| 10,305,155 | B2 | 5/2019 | Ebner et al. |
| 10,597,569 | B2 | 3/2020 | Razack et al. |
| 11,195,780 | B1 | 12/2021 | Gandhi et al. |
| 11,558,957 | B2 | 1/2023 | Altman et al. |
| 2009/0169983 | A1 | 7/2009 | Kumar et al. |
| 2012/0216981 | A1* | 8/2012 | Bank ............... F28D 20/023 165/10 |
| 2012/0273158 | A1* | 11/2012 | Cui ................. F03G 7/0614 165/10 |
| 2014/0183699 | A1 | 7/2014 | Dahlstrom |
| 2016/0084544 | A1* | 3/2016 | Radermacher ......... C09K 5/14 62/304 |
| 2016/0156213 | A1* | 6/2016 | Yajima ............. H01M 10/623 320/152 |
| 2019/0315500 | A1* | 10/2019 | Duong ............. B64G 1/506 |

OTHER PUBLICATIONS

D. Zhou, C. Zhao and Y. Tian, "Review on thermal energy storage with phase change materials (PCMs) in building applications," Appl Energy, vol. 92, pp. 593-605, 2012.
D. Haillot, T. Bauer, U. Kroner and R. Tamme, "Thermal analysis of phase change materials in the temperature range 120-150C," Thermochim Acta, vol. 513, No. 1-2, pp. 49-59, 2011.
A. Arteconi, N. Hewitt and F. Polonara, "State of the art of thermal storage for demand-side management," Appl Energy, vol. 93, pp. 371-389, 2012.
T. Lu, "Thermal management of high power electronics with phase change cooling," Int. J. Heat Mass Transfer, vol. 43, No. 13, pp. 2245-2256, 2000.
D. Yoo and Y. Joshi, "Energy efficient thermal management of electronic components using solid-liquid phase change materials," IEEE Trans Device Mater Rel, vol. 4, No. 4, pp. 641-649, 2004.
M. Farid et al., "A review of phase change energy storage: materials and applications," Energy Convers Manage, vol. 45, No. 9-10, pp. 1597-1615, 2004.
S. Mondal, "Phase change materials for smart textiles—an overview," Appl. Therm. Eng., vol. 28, No. 11-12, pp. 1536-1550, 2008.
P. Schossig and e. al., "Micro-encapsulated phase-change materials integrated into construction materials," Sol Energy Mater. Sol. Cells, vol. 89, No. 2-3, pp. 297-306, 2005.
A. Fallahi, G. Guldentops, M. Tai, S. Granado-Focil and S. Van Dessel, "Review on solid-solid phase change materials for thermal energy storage: Molecular structure and thermal properties," App. Therm. Eng., vol. 127, pp. 1427-1441, 2017.
V.H.K. Tiat, E.P. del Barrio, 2011, "Recent patents on Phase Change Materials and Systems for Latent Heat Thermal Energy Storage," Recent Patents on Mechanical Engineering, 4(1), pp. 16-28.
E. Wilhelm, C. Richter, B.E. Rapp, 2018, "Phase change materials in microactuators: Basics, applications and perspectives," Sensors and Actuators A: Physical, vol. 271, pp. 303-347.
J. M. Jani, M. Leary, A. Subic, M.A. Gibson, 2013, "A review of shape memory alloy research, applications and opportunities," Materials and Design, vol. 56, pp. 1078-1113.
"PCM Heat Sink Design Considerations," Advanced Cooling Technologies website, available at: https://www.1-act.com/innovations/thermal-storage/pcm-heat-sink-design-considerations/ (accessed Jun. 25, 2019).
Darin J. Sharar, Brian F. Donovan, Ronald J. Warzoha, Adam A. Wilson, Asher C. Leff, "Solid-State Thermal Energy Storage Using Reversible Martensitic Transformations," draft paper. Available at: https://arxiv.org/abs/1901.06990. (Submitted to arXiv.org on Jan. 21, 2019).
Darin J. Sharar, Brian F. Donovan, Ronald J. Warzoha, Adam A. Wilson, Asher C. Leff, and Brendan M. Hanrahan, Presentation titled "Reversible Martensitic transformations: A new approach to managing thermal transients," Annual Directed Energy Science &Technology Symposium, Destin FL, Apr. 8-12, 2019 (presentation given on Thursday Apr. 11, 2019).
Darin J. Sharar, Brian F. Donovan, Ronald J. Warzoha, Adam A. Wilson, Asher C. Leff, and Brendan M. Hanrahan, "Solid-state thermal energy storage using reversible martensitic transformations," Appl. Phys. Lett. 114, 143902 (2019) (Published Online: Apr. 12, 2019).
"Smart materials just got smarter," CCDC Army Research Laboratory Public Affairs, Apr. 26, 2019. Available at: https://www.art.army.mil/www/default.cfm?article=3415.

\* cited by examiner

FIG. 1 (*Background*)

NOVEL SOLID STATE (SS) MARTENSITIC TRANSFORMATIVE (MT) PHASE CHANGE MATERIAL (PCM)

SS MT PCM PHASE CHANGE

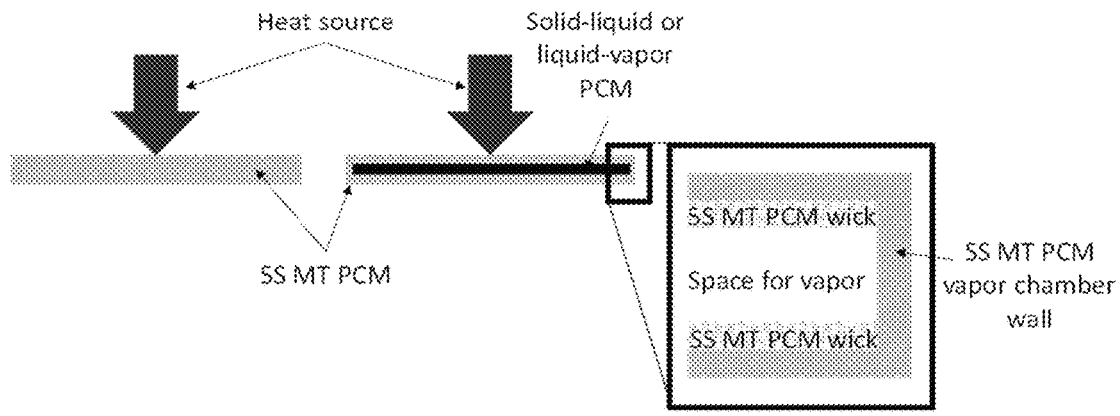
FIG. 9A  FIG. 9B
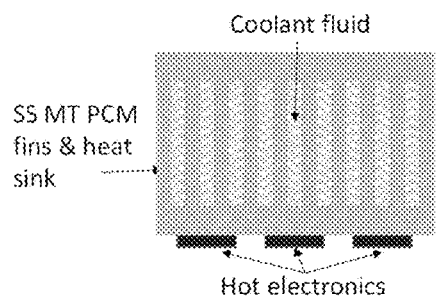 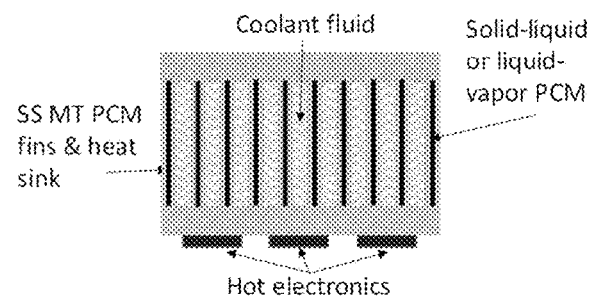
FIG. 10A  FIG. 10B
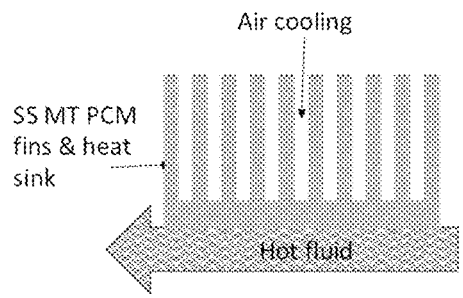 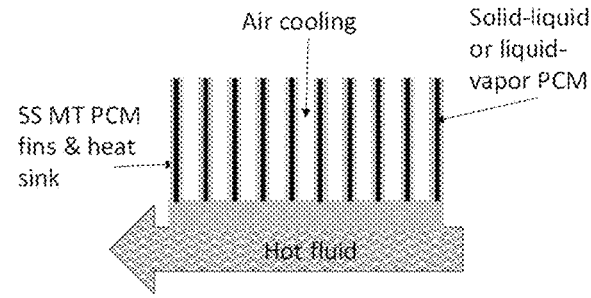
FIG. 11A  FIG. 11B

SOLID STATE MARTENSITIC TRANSFORMATION PHASE CHANGE MATERIAL COMPONENTS FOR THERMAL ENERGY STORAGE AND TRANSIENT HEAT TRANSFER SYSTEMS

RELATED APPLICATION DATA

This application claims the benefit of U.S. Provisional Patent Application No. 62/867,024 filed Jun. 26, 2019, herein incorporated by reference in its entirety, for all purposes.

GOVERNMENT INTEREST

The embodiments herein may be manufactured, used, and/or licensed by or for the United States Government without the payment of royalties thereon.

BACKGROUND

Technical Field

The embodiments herein generally relate to thermal energy storage and transient heat transfer systems, and more particularly, to solid-state Martensitic transformation phase change material components used in said systems.

Description of the Related Art

Thermal energy storage phase change materials (PCMs) offers an attractive approach to managing energy intermittency inherent to renewable sources, batteries, and electronic/photonic devices, alike. FIG. 1 summarizes the state of the art thermal energy storage (TES) solutions which can be used to store heat. They include sensible heat storage and solid-to-liquid phase change materials.

Sensible heat storage is the easiest to implement and relies on, as the name suggests, sensibly heating and cooling a material. Common storage media are water, sand-rock minerals, salts, and metals such as aluminum and cast iron. They do not require encapsulation making them simpler to work with from an engineering approach. These systems are often the cheapest option, but the storage capacity is generally low, requiring large volume and heavy solutions for a desired storage capacity.

Solid-to-liquid (SL) phase change materials (PCMs) have been typically preferred over sensible heat absorption due to the isothermal phase transition that temporarily results in a very high thermal capacitance. This allows thermal energy storage at a preferred temperature with minimal material weight and volume. For example, the latent heat of 1-Octadecanol is 225 kJ/kg and the specific heat of aluminum is 0.9 kJ/kgK; in order to store 225 kJ of thermal energy only 1 kg of 1-Octadecanol would need to be melted while the same mass of aluminum would need to be heated roughly 250° C. Alternatively, 250 kg of aluminum would need to be heated by 1° C. for the same energy storage. In both scenarios, using aluminum would be equally impractical. The former requires very large temperature cycles that would be nonviable for applications such as hot water heating and electronic cooling with standard operating ranges of only 100° C., from room temperature to upwards of 125° C. The latter requires large and heavy TES systems that limit adoption in aforementioned size and weight-limited applications.

Solid-to-liquid (SL) PCMs may offer a caloric benefit over aluminum and other sensible materials, but are not without their own challenges. These materials suffer from low thermal conductivity, ranging between 0.1 to 1 W/mK, which limits heat transfer into and out of the material. Combined with the fact that SLPCMs by definition melt upon heating, these favorable material energy densities are reduced in practical applications where encapsulation and thermal conductivity enhancement is needed. More specifically, current solid-liquid TES prototypes rely on metallic fin structures, high thermal conductivity additives, and/or encapsulation to provide mechanical support, prevent molten PCM leakage, and enhance poor PCM thermal conductivity. Engineering approaches for this class of PCMs involve encapsulation and enhancement. SL PCMs require some additive and/or extended surfaces to contain and/or hold that material as it softens and liquefies. Additives may include, for instance, compressed expanded natural graphite, core-shell confinement, carbon nanotubes, nanoparticles, etc. And extended surface may include, for instance, aerogels, metal matrix, porous mesh, vapor chambers 3D graphene foam, etc.

So far, the need for encapsulation and the goal of increasing power by adding high thermal conductivity materials necessarily comes at the expense of reduced module capacity. In many cases, this reduces the mass and volume of active PCM material by well over half. Examples from the literature have evaluated commercial heat exchangers for use as PCM thermal storage systems and reported PCM to total weight ratios ranging from 0.024 to 0.579. Others employed copper foam and fins and reported ⅓ less time for complete PCM melting, but at the cost of a 0.51 PCM to total weight ratio. Compressed expanded natural graphite (CENG) and paraffin composites have been used to improve the effective thermal conductivity from 0.3 to 10.1 W/mK. The consequence was a 32% reduction in the effective latent heat, from 163.4 to 111.1 kJ/kg. Even using Additive Manufacturing (AM) to fabricate composite structures, which enables unparalleled design flexibility and optimization, necessarily requires sacrificing PCM volume for conductive fins.

These enhancements and encapsulation techniques, therefore, represent a key bottleneck for compact thermal energy storage systems.

SUMMARY

The technology of the present invention involves the novel use of solid-solid Martensitic transformation phase change material.

According to embodiments, a heat exchange component comprises a part configured for exchanging thermal energy. The part is formed of at least one solid state Martensitic transformation phase change material which is configured to readily undergo a solid-solid martensitic transformation from one crystalline structure to another different crystalline structure during a change in temperature in the normal and/or anticipated operating temperatures of the heat exchange component.

The crystalline structures may include, but are not limited to, B2, R-phase, B19, and B19' crystalline lattices. The part may comprise (i) one portion formed of SS MT PCM being configured to be at one temperature, and (ii) at least another portion formed of SS MT PCM being configured to be at a second different temperature. Thus, a thermal gradient is provided. In some cases, the martensitic transformation is reversible, but this is not a requirement for all embodiments. The part may be fully or partially formed of SS MT PCM.

The SS MT PCM may comprise: a shape memory alloy (SMA), ceramic or other metal and/or alloy which readily undergoes a solid-solid martensitic transformation. For instance, the SS MT PCM may be selected from one or more of the materials listed in Table 1. More particularly, the SMAs may include: nickel-tin-based alloy systems, a copper-based alloy systems, or magnetic alloy systems. As a general guideline, the SS MT PCM is selected to have a Figure of Merit (FOM) of at least $15 \times 10^6$ $J^2/Ksm^4$. In some embodiments, the SS PCM material may have a FOM of at least $1,000 \times 10^6$ $J^2/Ksm^4$ or even $10,000 \times 10^6$ $J^2/Ksm^4$ or more.

Depending on the particular thermal energy storage and transient heat transfer system and structure, the heat exchange component may be configured as a heat transfer surface, a heat exchanger, a heat spreader, a heat sink, a heat or cold plate, a condenser, a radiator, a fin or fins, or a fluidic channel, as just a few non-limiting examples. In some embodiments, the component may additionally incorporate a solid-to-liquid and/or liquid-to-vapor/gas phase change material. The component may also incorporate a coolant fluid. Through heating or melting, the thermal conductivity, transformation temperature and thermal conductivity of the SS MT PCM can be altered at least partially. The component may be configured to exchange thermal energy with a thermal transfer fluid that is internal and/or external to the component.

According to some embodiments, a thermal energy storage and/or heat transfer system comprises: a temporally-evolving temperature source heat source; and a component formed of at least one solid state Martensitic transformation phase change material, wherein the SS MT PCM of the component readily undergoes a solid-solid martensitic transformation from one crystalline structure to another different crystalline structure during a change in temperature in the normal and/or anticipated operating temperatures of the thermal energy storage and/or heat transfer system. The temperature/heat source changes the temperature and resultant phase of the solid-state phase change material during operation. The change in phase of the solid-state phase change material may change the entropy of the material, resulting in an endothermic or exothermic response. The temporally-evolving temperature/heat source may be a solid conducting material, an electronic/photonic component, a fluid, a plasma, and/or a radiation source.

In other embodiments, an electronic interconnect system may comprise: an electronic component which generates heat along with a component formed of the solid state Martensitic transformation phase change material which is configured to readily undergo a solid-solid martensitic transformation from one crystalline structure to another different crystalline structure during a change in temperature in the normal and/or anticipated operating temperatures of the electronic interconnect system. The latter element is connected to former and further configured to conduct electricity. In particular, the electronic component may comprise one or more of: integrated circuits, chips, resistors, capacitors, inductors, diodes, transistors, transformers, fuses, and switches. Additionally or alternatively, the electronic component may be configured as one or more of: junctions, metallic traces, wirebonds, and solder bonds, as a few non-limiting examples.

According to yet other embodiments, a method of operating a heat exchange system comprises: heating or cooling a component formed of the solid state Martensitic transformation phase change material to allow the SS MT PCM of the component to readily undergo a solid-solid martensitic transformation from one crystalline structure to another different crystalline structure during a change in temperature in the normal and/or anticipated operating temperatures of the heat exchange system.

According to further embodiments, a method of lowering the operational temperature of a component in a system which stores and/or transfers heats comprises: substituting a component in the system with a component formed of the solid state Martensitic transformation phase change material, wherein the SS MT PCM of the component readily undergoes a solid-solid martensitic transformation from one crystalline structure to another different crystalline structure during a change in temperature in the normal and/or anticipated operating temperatures of the thermal energy storage and/or heat transfer system so as to lower the operational temperature of the component in the system compared to the substituted component.

According to even further embodiments, a method of increasing the time of use of a component in a system which stores and/or transfers heats comprises: substituting a component in the system with a component formed of the solid state Martensitic transformation phase change material, wherein the SS MT PCM of the component readily undergoes a solid-solid martensitic transformation from one crystalline structure to another different crystalline structure during a change in temperature in the normal and/or anticipated operating temperatures of the thermal energy storage and/or heat transfer system so as to increase the time of use of the component in the system compared to the substituted component.

According to additional embodiments, there are provided methods of designing a heat exchange component formed of a solid state Martensitic transformation phase change material which readily undergoes a solid-solid phase change during normal and/or anticipated operating temperatures component in a system which stores and/or transfers heats. Such methods may generally include: identifying an application system which generates, stores or transfers heat; identifying a component formed of solid state Martensitic transformation phase change material (PCM) to be used for the identified application system, wherein the SS MT PCM of the component is configured to readily undergo a solid-solid martensitic transformation from one crystalline structure to another different crystalline structure during a change in temperature in the normal and/or anticipated operating temperatures of the application system; determining key parameters of the identified application system; and optimizing said component for the identified application system based on the determined key parameters.

More particularly, the designing of said component may involve identifying a solid state phase change material to fabricate the identified component which is suitable for the identified application system. Additionally, the designing said component may include: modelling the determined key parameters, optimizing the PCM figure of merit for the identified application system, creating a manageable thermal load profile for the component in the application system, and/or fabricating the designed component. The method may further include integrating the fabricated component into the application system. Determining key parameters of the design may involve identifying one or more of: cycle speed, heat load, maximum and minimum temperature range, heat transfer media, size, and weight constraints. Likewise, this step may include an ideal location or locations for the component in the application system architecture.

According to embodiments, a method a fabricating a heat exchange component comprises: forming a component from a solid state Martensitic transformation phase change material, wherein the SS MT PCM of the fabricated component is configured to readily undergo a solid-solid martensitic transformation from one crystalline structure to another different crystalline structure during a change in temperature in the normal and/or anticipated operating temperatures of the heat exchange component. The fabrication methods may further include: heating or melting the SS MT PCM to alter its thermal conductivity, transformation temperature and latent heat at least partially. The heating or melting may be performed using with a laser. Alternatively, heating could be performed in a furnace.

The aforementioned embodiments can offer the benefits of; the elimination of voids and packaging associated with melt-thaw cycles (solid-liquid), immunity to phase segregation, and tunable phase transition temperature. Additionally, the use of solid-state Martensitic transformation PCMs may offer advantages including, the ability to directly manufacture using additive manufacturing techniques, biocompatibility, low thermal hysteresis, fast transformation times, high thermal conductivity and the high volumetric latent heat for any known solid-solid PCM.

Hence, the disclosed embodiments provide a highly efficient solid-solid Martensitic transformation PCM that exceeds the thermal energy storage and transient performance of traditional solid-liquid PCMs such as organic, organo-metallic, inorganic, and polymeric materials. The use of this class of phase change materials can altogether eliminate the need for passive fins, encapsulates, and additives that have historically been a hindrance in designing compact thermal energy storage systems. It offers a practical and relatively easy approach for the development of high performance solid-solid PCM materials for the thermal energy storage and transient thermal management market.

These and other aspects of the embodiments herein will be better understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 9A and 9B show schematic diagrams of a solid-state Martensitic transformation PCM heat spreader and a combined solid-state MT phase change and solid-liquid or liquid-vapor phase change material heat spreader, respectively, in accordance with embodiments.

FIGS. 10A and 10B show schematic diagrams of a solid-state Martensitic transformation phase change heat sink or cold plate and a combined solid-state MT phase change and solid-liquid or liquid-gas heat sink, respectively, in accordance with embodiments.

FIGS. 11A and 11B show schematic diagrams of a solid-state Martensitic transformation phase change condenser/radiator and a combined solid-state MT phase change and solid-liquid or liquid-gas condenser/radiator, respectively, in accordance with embodiments.

Figure 1:
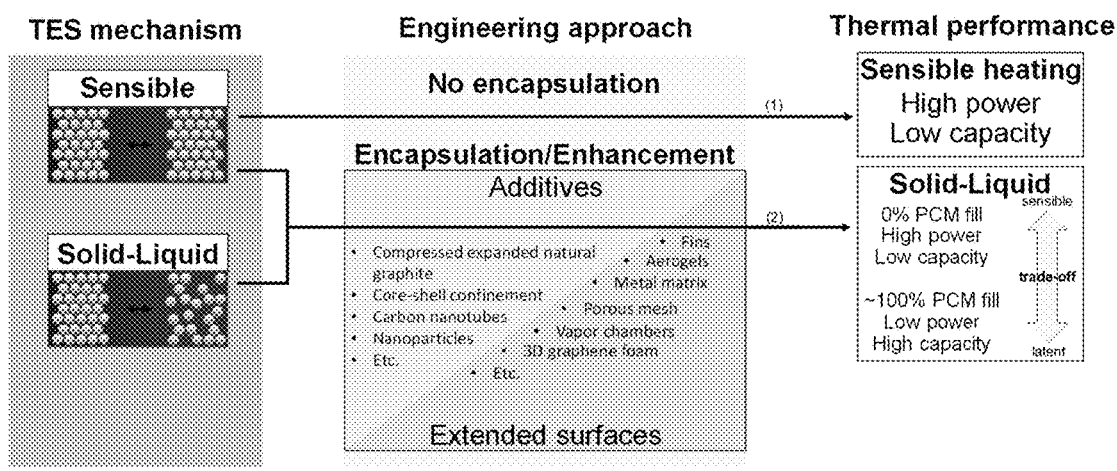
FIG. 1 briefly summarizes conventional thermal energy storage solutions, which can be used to store heat, as background.
Figure 2:
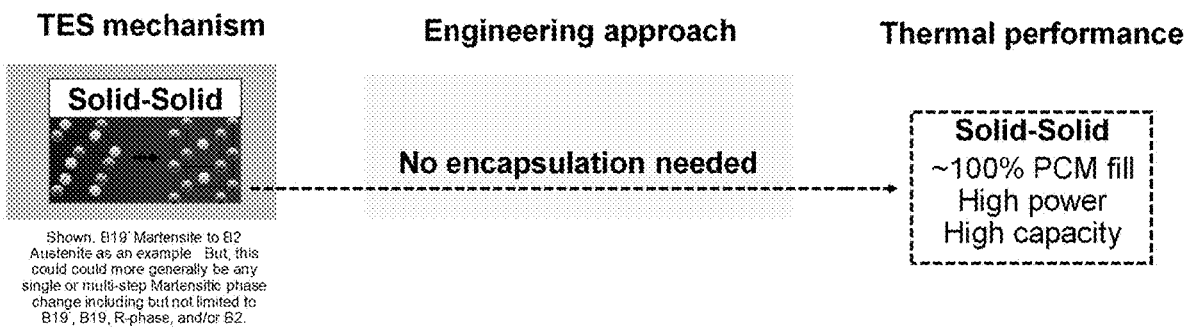
FIG. 2 introduces the novel use of solid state (SS) Martensitic transformation (MT) phase change materials (PCM) according to embodiments of the present invention.

TABLE 1 lists various candidate materials, and their corresponding transition temperatures, thermally-induced latent heat, and FOM (where available) according to embodiments herein.

TABLE 2 lists parameters of exemplary heat exchange components' designs in accordance with embodiments.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art of practice the embodiments herein. Accordingly, the examples should not be construed as limiting the scope of the embodiments herein.

DETAILED DESCRIPTION

The embodiments herein provide solid-state thermal energy and heat transfer structures. Referring now to the drawings, and more particularly to FIGS. 1 through 19, where similar reference characters denote corresponding features consistently throughout the figures, there are shown preferred embodiments. In the drawings, the size and relative sizes of components, layers, and regions, etc. may be exaggerated for clarity.

In contrast to the known materials and techniques discussed above, FIG. 2 introduces the novel use of solid state (SS) Martensitic transformation (MT) phase change materials (PCM) according to embodiments of the present invention.

As used herein, "solid state (SS)" refers to a substance or material that remains a solid throughout normal and/or anticipated operating temperatures. And, "phase change material (PCM)" refers to a substrate or material that change phases in response to thermal input. Phase changes may include changes in matter states, such as: gas/vapor↔liquid, liquid↔solid, and solid↔gas/vapor. Phase changes may also include phase changes within one matter state, most notably, solid (phase 1)↔solid (phase 2). For purposes of this invention, a "solid state (SS) phase change material (PCM)" is limited to substances and material which exhibit the latter phase change within a solid.

A subset of SS PCMs, which are used in embodiments of the present invention, are Martensitic phase transformation PCMs. For purposes of this invention, "SS Martensitic Transformation PCM" or "SS MT PCM" refer to a material which undergoes a solid-solid martensitic transformation from one crystalline structure to another different crystalline structure during a change in temperature in the normal and/or anticipated operating temperatures. As further used herein, and according to conventions in the literature, the term "Martensitic transformation" can be generally used to refer to any of the solid-solid phase transformations. These may involve, but are not necessarily limited to, the B2, R-phase, B19, and B19' Martensitic phases for instance. Intermediate R-phase and B19 transformations are also possible. The martensitic transformation occurs in one or more steps.

Because they are always solid, this class of PCMs does not require encapsulation making them easier from an engineering approach. In practice, structures can be fabricated that contain approximately 100% solid-to-solid phase change material. This makes them advantageous for use or fill for high capacity and high power thermal applications.

Figure 3:
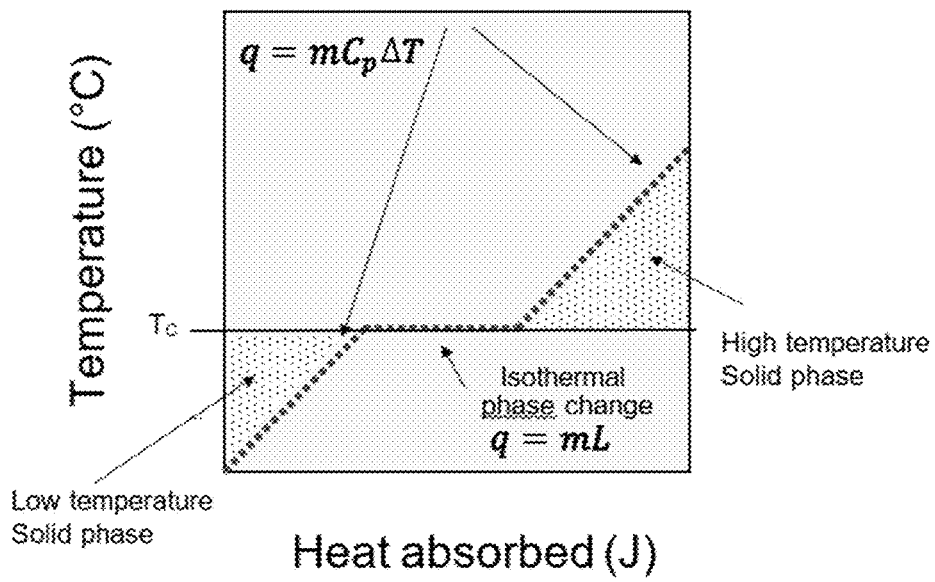
FIG. 3 shows the isothermal phase transition that occurs in SS MT PCMs temporarily results in a very high thermal capacitance and this allows thermal energy storage at a preferred temperature with minimal material weight and volume.

FIG. 3 is a plot showing the isothermal phase transition that occurs in SS MT PCMs temporarily results in a very high thermal capacitance and this allows thermal energy storage at a preferred temperature with minimal material weight and volume. Initially, at the low temperature solid phase, the material exhibits a sensible temperature rise, according to the standard specific heat formula:

$$q = m\, C_p \Delta T, \qquad (1)$$

where q is the heat energy (J), m is the mass of material (kg), $C_p$ is the specific heat constant for the material (units J/kgK), and $\Delta T$ is the change in temperature (Kelvins, K). The material goes through an isothermal phase change at a phase change temperature, $T_C$, according to the latent heat formula, $$q = mL, \qquad (2)$$

where q is the heat energy (J), m is the mass of material (kg), and L is the specific latent heat of the material (J/kg). At this point, there is essentially no change in temperature but the material continues to absorb a great deal of heat. The change in phase of the solid-state phase change material may changes the entropy of the material, resulting in an endothermic or exothermic response. Once the material has transitioned to the high temperature phase, the material once again exhibits a sensible temperature rise, according to the specific heat formula of equation (1). This phenomena is generally the same for all SS MT PCMs.

The SS MT PCM may comprise a so-called "Shape Memory Alloy" or "SMA" in some embodiments, although, the inventors do not specifically rely on this particular property of the material SMAs may include one or more of: a binary shape memory alloy, a ternary shape memory alloy, a quaternary shape memory alloy, a higher-order alloyed shape memory alloy, or any other material which can readily change phase while remaining solid at normal and/or anticipated operating temperatures.

The nickel-titanium alloy system, known as NiTi or Nitinol, is one of the best known shape memory alloy materials which can be used in embodiments disclosed herein. It is formed of an alloy of nickel and titanium, where the two elements are present in roughly-equal atomic percentages, typically 50 to 51% nickel by atomic percent (55 to 56% weight percent). Different alloys thereof are named according to their weight percentage of nickel, e.g. Nitinol 55. In general, for Nitinol-based SMAs, the more titanium-rich (less nickel), the higher the transformation temperature.

In the past, Nitinol has been utilized for its unique elastically-induced phase transformation and shape memory properties. For example, U.S. Pat. No. 6,557,993 discloses standard eyeglasses parts made out of NiTi to take advantage of the elastically-induced phase transformation. By contrast, embodiments of the present invention make use a different property, i.e., the thermally-induced solid-to-solid phase transformations of this material.

Figure 4:
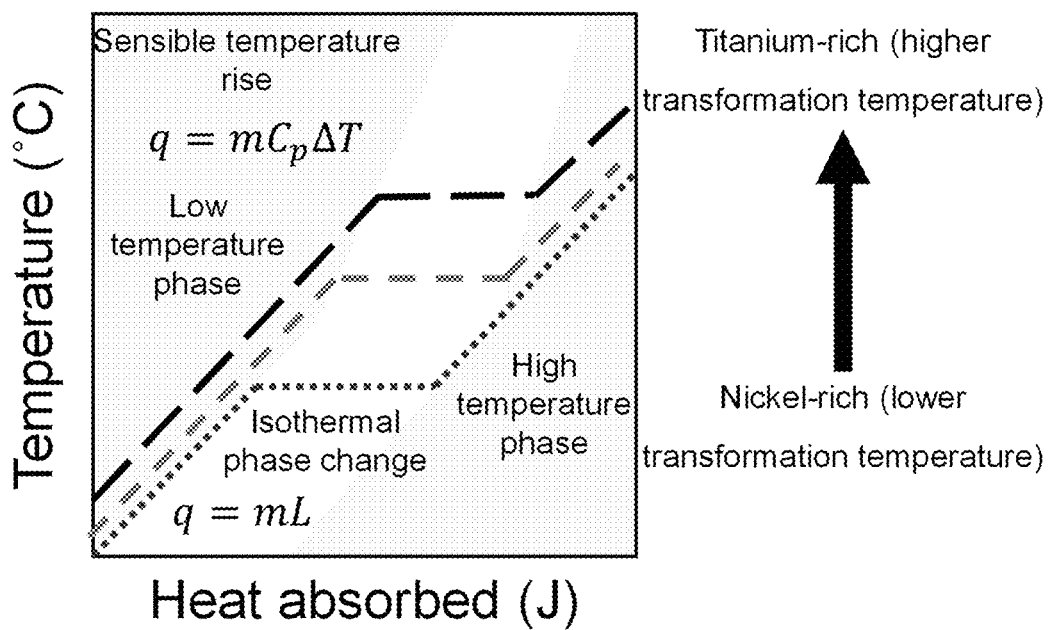
FIG. 4 shows how the phase change phenomena can for tailored for nickel titanium alloys, also known as NiTi or Nitinol, in particular.

The specific thermal response characteristics will depend on the material. FIG. 4 shows how the phase change temperature can be tailored for nickel titanium alloys, also known as NiTi or Nitinol, in particular. The different dashed lines represent materials that have different amounts of Nickel and Titanium in the matrix. By changing composition from roughly 51 atomic percent Nickel to 48.5 atomic percent Nickel (balance Titanium), the transformation temperature can be changed from roughly −70° C. to 100° C. As shown, from a caloric standpoint SS MT PCMs enables either cooler device temperatures for a given heat input or enable higher power or longer pulse duration for a given temperature rise. Both are overarching goals for electronic and photonic devices.

For instance, the high temperature parent phase of NiTi is cubic B2, and the lattice of the martensite is a monoclinic B19' phase. The B19'martensite can be obtained either by a single step transformation of B2→B19', or by a two-step transformation of B2→R-phase→B19' and/or B2→B19→B19'. R-phase has the Rhombohedral crystal structure, appears in some special cases, and depends on several factors like thermal history, cold work, solution treatment of the sample etc. It was found that in doped alloys, B19 can exist as an intermediate phase instead of R-phase. B19 is an orthorhombic phase (space group Pmmb). It is possible to induce partial or full transformations, including, but not limited to B2→R-phase, R-phase→B19', B2→B19, B19→B19', and B2→B19'. Because it is a reversible process, the opposite direction is also possible, for example R-phase→B2 (which would occur during cooling rather than heating as is the case in B2→R-phase). Of course, there are tradeoffs to any Martensitic transformation, such as going from B2→R rather than B2→B19'. For instance, the R-phase has some attracting properties like stability to thermal cycling and ageing, very small thermal hysteresis and very high fatigue life, etc.; however, the energy associated with the R-phase transformation is also small, generally leading to lower latent heat.

These near instantaneous, diffusionless, reversible, first-order transformations are more broadly referred to as a Martensitic transformation and results in a lower symmetry through a distortion of the existing atomic lattice. This thermally-induced distortion results in large enthalpy changes and corresponding volumetric latent heats approaching 225 MJ/m$^3$. In addition to the high volumetric latent heat, materials that exhibit Martensitic transformations have a number of attractive properties including high thermal conductivity, approaching 150 W/mK, excellent corrosion resistance, high strength and ductility, and good formability via traditional thermomechanical processing, machining, and manufacturing. Furthermore, the SMA transformation temperature, latent heat, thermal conductivity, and structural properties can be engineered by altering the Ni and Ti balance, alloying, and adjusting thermomechanical processing. This provides material tailorability not generally possible with standard point-solution PCMs and, moreover, represents a class of robust, high thermal conductivity, commercially available materials of immediate interest for TES.

Generally the process is reversible. But in some applications, one may not need reversibility, i.e., it could be one-way. Consider one non-limiting example for high power microwave applications: we run devices until they "overheat" and ultimately expire. So, we start at room temperature, and run the device at maximum power until it overheats and stops working. In that case, this material could be used to extend the duration that it can run. It would only transform in one direction, e.g., from cold to hot (M→A).

The Figure of Merit (FOM) is a quantifiable measure of relative PCM performance. (See T. Lu, "Thermal management of high power electronics with phase change cooling," *International Journal of Heat and Mass Transfer*, vol. 43, pp. 2245-2256, 2000, herein incorporated by reference in its entirety). The FOM of a PCM is defined as follows:

$$FOM = \rho \times L \times k_{HT} \quad (3)$$

where ρ is density, L is the latent heat of transformation, and $k_{HT}$ is the thermal conductivity of the high temperature phase. In SI units, density ρ may be given in kg/m$^3$; latent heat of transformation L may be given in J/kg; and thermal conductivity $k_{HT}$ may be given in W/mK, and the resulting units of the FOM values should be ×10$^6$ J$^2$/Ksm$^4$.

A high FOM represents a high volumetric heat capacity (ρ×L) and the ability to readily absorb and discharge thermal energy ($k_{HT}$). Indeed, these material properties and the resultant FOM are useful for expressing relative performance or efficiency for PCM materials in context of large-capacity and high-power thermal exchange and storage operations.

Table 1, below, lists some exemplary Solid State Martensitic transformation phase change materials, transition temperatures, thermally-induced latent heat, and FOM which may be used in embodiments of the present invention. They may include shape memory alloys (SMA), ceramics or other metals and/or alloys, which are capable of obtaining both Martensite and Austenite structures. More particularly, the SMA may comprise: nickel-titanium-based alloy system, a copper-based alloy system, or magnetic alloys. They may comprise one or more of: a binary shape memory alloy, a ternary shape memory alloy, a quaternary shape memory alloy, a higher-order alloyed shape memory alloy, or any other material which can readily change phase while remaining solid at normal and/or anticipated operating temperatures.

TABLE 1

Some exemplary solid state Martensitic transformation phase change materials, transition temperatures, thermally-induced latent heat, and FOM

| Material Class | Composition | Transition temperature (° C.) | Latent heat $L_{M-A}$ (J/g) | FOM (×10$^6$ J$^2$/(Ksm$^4$)) |
|---|---|---|---|---|
| Martensitic transformation (Shape Memory Alloy - NiTi-based) | $Ni_{47.73}Ti$ | 57 | 13.46 | 1478 |
| | $Ni_{47.73}Ti$* (R-phase transformation) | 40 | 4.54 | 498 |
| . | $Ni_{48.62}Ti$ | 90 | 27 | 2716-4876 |
| . | $Ni_{49.5}Ti$ | 91 | 30.1 | 3028-5436 |
| . | $Ni_{49.6}Ti$ | −3.8 | 18.3 | 1841-3304 |
| . | $Ni_{49.63}Ti$ | 46.7 | 21.6 | 2173-3900 |
| . | $Ni_{49.68}Ti$ | 81.9 | 31.7 | 3189-5725 |
| . | $Ni_{49.74}Ti$ | 86.3 | 22.9 | 2304-4135 |
| . | $Ni_{50.01}Ti$ | 52.7 | 27 | 2716-4876 |
| . | $Ni_{50.13}Ti$ | −21.9 | 14.9 | 1499-2690 |
| . | $Ni_{50.17}Ti$ | −39.1 | 9.1 | 915-1643 |
| . | $Ni_{50.18}Ti$ | 47.2 | 26.7 | 2686-4822 |
| . | $Ni_{50.21}Ti$ | 4.1 | 16.5 | 1660-2979 |
| . | $Ni_{50.42}Ti$ | 17 | 23.3 | 2344-4207 |
| . | $Ni_{50.49}Ti$ | 17.8 | 23.9 | 2404-4316 |
| . | $Ni_{50.58}Ti$ | −10.8 | 18.8 | 1891-3395 |

TABLE 1-continued

Some exemplary solid state Martensitic transformation phase change materials,
transition temperatures, thermally-induced latent heat, and FOM

| Material Class | Composition | Transition temperature (° C.) | Latent heat $L_{M\text{-}A}$ (J/g) | FOM ($\times 10^6$ $J^2/(Ksm^4)$) |
|---|---|---|---|---|
| . | $Ni_{50}Ti_{49.9}Cr_{0.1}$ | 89.25 | 30 | 3018-5418 |
| . | $Ni_{50}Ti_{49.75}Cr_{0.25}$ | 63.25 | 23.7 | 2384-4280 |
| . | $Ni_{50}Ti_{49.5}Cr_{0.5}$ | 42.35 | 23.3 | 2344-4207 |
| . | $Ni_{50}Ti_{49.35}C_{50.65}$ | 33.2 | 21.3 | 2143-3846 |
| . | $Ni_{50}Ti_{49.2}Cr_{0.8}$ | 13.05 | 20.8 | 2092-3756 |
| . | $Ni_{50}Ti_{49}Cr_{1}$ | −12.8 | 15.2 | 1529-2745 |
| . | $Ni_{50}Ti_{48.75}Cr_{1.25}$ | −46.2 | 10.1 | 1016-1824 |
| . | $Ni_{50}Ti_{49.9}V_{0.1}$ | 101.15 | 30.1 | 3028-5436 |
| . | $Ni_{50}Ti_{49.75}V_{0.25}$ | 82.9 | 24.9 | 2505-4496 |
| . | $Ni_{50}Ti_{49}V_{1}$ | 64.5 | 23.2 | 2334-4189 |
| . | $Ni_{50}Ti_{48}V_{2}$ | 54.7 | 22.2 | 2233-4009 |
| . | $Ni_{50}Ti_{47}V_{3}$ | 35.9 | 16.9 | 1700-3052 |
| . | $Ni_{50}Ti_{45}V_{5}$ | 18.3 | 12 | 1207-2167 |
| . | $Ni_{50}Ti_{44}V_{6}$ | 15.15 | 10.6 | 1066-1914 |
| . | $Ni_{43}Ti_{52}Cu_{5}$ | 73.2 | 24.2 | 2435-4370 |
| . | $Ni_{43.5}Ti_{51.5}Cu_{5}$ | 77.6 | 24.7 | 2485-4460 |
| . | $Ni_{44}Ti_{51}Cu_{5}$ | 77.75 | 24.1 | 2424-4352 |
| . | $Ni_{44.25}Ti_{50.75}Cu_{5}$ | 73.95 | 25.9 | 2606-4677 |
| . | $Ni_{44.5}Ti_{50.5}Cu_{5}$ | 74.75 | 25.7 | 2585-4641 |
| . | $Ni_{44.6}Ti_{50.4}Cu_{5}$ | 77.9 | 29.1 | 2928-5255 |
| . | $Ni_{44.75}Ti_{50.25}Cu_{5}$ | 81.55 | 23.6 | 2374-4262 |
| . | $Ni_{45}Ti_{50}Cu_{5}$ | 80.65 | 29.3 | 2948-5291 |
| . | $Ni_{45.2}Ti_{49.8}Cu_{5}$ | 66.5 | 27 | 2716-4876 |
| . | $Ni_{45.3}Ti_{49.7}Cu_{5}$ | 57.15 | 25.2 | 2535-4551 |
| . | $Ni_{45.5}Ti_{49.5}Cu_{5}$ | 48.4 | 24.3 | 2445-4388 |
| . | $Ni_{45.7}Ti_{49.3}Cu_{5}$ | 30.05 | 21.7 | 2183-3919 |
| . | $Ni_{45.9}Ti_{49.1}Cu_{5}$ | 10.45 | 14.3 | 1438-2582 |
| . | $Ni_{46}Ti_{49.1}Cu_{5}$ | 2.7 | 16.8 | 1690-3034 |
| . | $Ni_{46.1}Ti_{48.9}Cu_{5}$ | −7 | 19.4 | 1952-3503 |
| . | $Ni_{46.2}Ti_{48.8}Cu_{5}$ | −21.4 | 14 | 1408-2528 |
| . | $Ni_{47.5}Ti_{50}Cu_{2.5}$ | 94.2 | 31 | 3119-5598 |
| . | $Ni_{42.5}Ti_{50}Cu_{7.5}$ | 76.8 | 27.9 | 2807-5038 |
| . | $Ni_{49.8}Ti_{48.2}Hf_{2}$ | 103.5 | 29.3 | 2948-5291 |
| . | $Ni_{49.8}Ti_{46.2}Hf_{4}$ | 114.65 | 29.1 | 2928-5255 |
| . | $Ni_{49.8}Ti_{44.2}Hf_{6}$ | 128.35 | 29.1 | 2928-5255 |
| . | $Ni_{49.8}Ti_{42.2}Hf_{8}$ | 160.2 | 30.3 | 3048-5472 |
| . | $Ni_{49.8}Ti_{40.2}Hf_{10}$ | 178.6 | 29 | 2917-5237 |
| . | $Ni_{49.8}Ti_{39.2}Hf_{11}$ | 189.45 | 29.3 | 2948-5291 |
| . | $Ni_{49.8}Ti_{35.2}Hf_{15}$ | 248.45 | 31.3 | 3149-5652 |
| . | $Ni_{49.8}Ti_{30.2}Hf_{20}$ | 330.2 | 35.1 | 3531-6339 |
| . | $Ni_{45}Ti_{50}Pd_{5}$ | 72.2 | 25.8 | 2595-4659 |
| . | $Ni_{43}Ti_{50}Pd_{7}$ | 66.2 | 23.8 | 2394-4298 |
| . | $Ni_{41}Ti_{50}Pd_{9}$ | 63.25 | 18.4 | 1851-3323 |
| . | $Ni_{39}Ti_{50}Pd_{11}$ | 68.15 | 14.5 | 1458-2618 |
| . | $Ni_{37}Ti_{50}Pd_{13}$ | 86.05 | 16.4 | 1650-2961 |
| . | $Ni_{35}Ti_{50}Pd_{15}$ | 99.35 | 17.7 | 1780-3196 |
| . | $Ni_{33}Ti_{50}Pd_{17}$ | 118.45 | 18.7 | 1881-3377 |
| . | $Ni_{29}Ti_{50}Pd_{21}$ | 160.45 | 21.6 | 2173-3900 |
| . | $Ni_{20}Ti_{50}Pd_{30}$ | 267.85 | 29.7 | 2988-5363 |
| . | $Ni_{49.5}Ti_{49.5}Zr_{1}$ | 100.6 | 30.6 | 3078-5526 |
| . | $Ni_{49.5}Ti_{47.5}Zr_{3}$ | 102.7 | 23.3 | 2344-4207 |
| . | $Ni_{49.5}Ti_{45.5}Zr_{5}$ | 104 | 27 | 2716-4876 |
| . | $Ni_{49.5}Ti_{40.5}Zr_{10}$ | 142 | 27.3 | 2746-4930 |
| . | $Ni_{49.5}Ti_{35.5}Zr_{15}$ | 221.65 | 28.8 | 2897-5201 |
| . | $Ni_{49.5}Ti_{30.5}Zr_{20}$ | 322.55 | 35 | 3521-6321 |
| . | $Ni_{28.5}Ti_{50.5}Pt_{21}$ | 330.85 | 22.4 | 2606-4677 |
| . | $Ni_{43.5}Ti_{50}Cu_{5}Co_{1.5}$ | 53.85 | 25.9 | 2606-4677 |
| . | $Ni_{42}Ti_{50}Cu_{5}Co_{3}$ | 30.2 | 23.8 | 2394-4298 |
| . | $Ni_{40}Ti_{50}Cu_{5}Co_{5}$ | −5.35 | 21.6 | 2173-3900 |
| . | $Ni_{42.9}Ti_{50}Cu_{5}Pd_{2.1}$ | 66.35 | 14.9 | 1499-2690 |
| . | $Ni_{41.9}Ti_{50}Cu_{5}Pd_{3.1}$ | 73.1 | 16 | 1609-2889 |
| . | $Ni_{39.2}Ti_{50}Cu_{5}Pd_{5.8}$ | 67.45 | 14.2 | 1428-2564 |
| . | $Ni_{38.3}Ti_{50}Cu_{5}Pd_{6.7}$ | 65.65 | 13.6 | 1368-2456 |
| . | $Ni_{32.2}Ti_{50}Cu_{5}Pd_{12.8}$ | 59.85 | 12.3 | 1237-2221 |
| Martensitic transformation (Shape Memory Alloy - Cu-based) | CuAlNi | variable | 6.8 | ~6000 |
| | CuZnAl | variable | 6.2 | ~6000 |
| | CuAlMn | variable | 5.0 | ~6000 |
| | CuZnSn | variable | 4.5 | ~6000 |
| Martensitic transformation (Shape Memory Alloy - magnetic alloys) | NiMnSnCu | variable | variable | variable |
| | NiMnTi | variable | variable | variable |
| | NiMnGa | variable | variable | variable |
| | NiMnSbCo | variable | variable | variable |
| | NiMnSn | variable | variable | variable |
| | NiMnIn | variable | variable | variable |

TABLE 1-continued

Some exemplary solid state Martensitic transformation phase change materials, transition temperatures, thermally-induced latent heat, and FOM

| Material Class | Composition | Transition temperature (° C.) | Latent heat $L_{M-A}$ (J/g) | FOM (×10$^6$ $J^2/(Ksm^4)$) |
|---|---|---|---|---|
|  | NiFeGa | variable | variable | variable |
|  | NiFeGaCo | variable | variable | variable |
|  | CoNiAl | variable | variable | variable |
| Martensitic | Zirconia | N/A | N/A | N/A |
| transformation | Zirconia (Mg-PSZ) | N/A | N/A | N/A |
| (Ceramics) | Zirconia (Y-TZP) | N/A | N/A | N/A |
|  | Zirconia (Ce-TZP) | N/A | N/A | N/A |
| Martensitic | Steel | 727 | 70 | 28,175 |
| transformation | FeC | N/A | N/A | N/A |
| (Other Metals and alloys) | CsCl | 479 | N/A | N/A |

Figure 5:
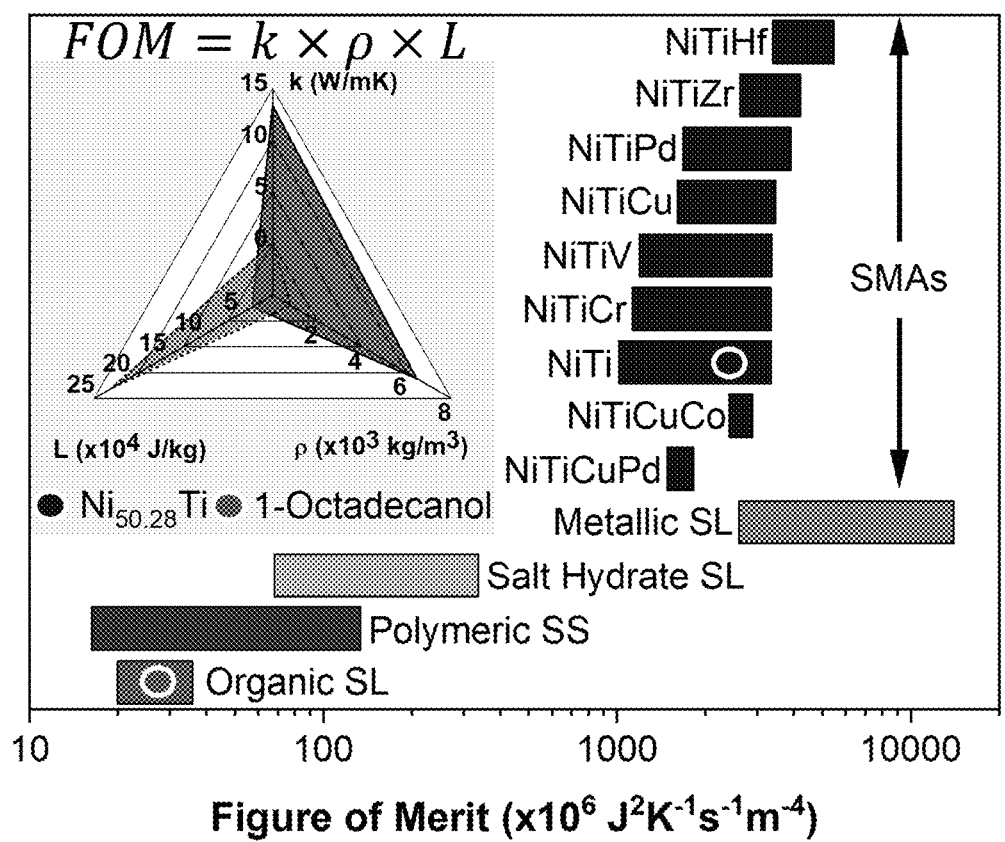
FIG. 5 shows the Figure of Merit for various solid state Martensitic transformation phase change materials according to embodiments of the present invention, compared to conventional phase change materials.

FIG. 5 shows the Figure of Merit for various phase change materials Solid State Martensitic Transformation Phase Change Materials according to embodiments of the present invention, as well as some other comparative state of the art PCMs.

The latter group include organic solid-liquid PCMs, polymeric solid-solid PCMs, solid-liquid salt hydrate PCMs, and metallic solid-liquid PCMs. Organic SL material have low FOMs. For instance, paraffin and 1-Octadecanol have Figures of Merit of approximately 23×10$^6$ $J^2$/Ksm$^4$ and 27.3×10$^6$ $J^2$/Ksm$^4$, respectively. While these and other typical solid-to-liquid (SL) polymeric PCMs offer a caloric benefit over aluminum and other sensible materials, they are not without their own challenges. These materials suffer from low thermal conductivity, ranging between 0.1 to 1 W/mK, which limits heat transfer into and out of the material. Combined with the fact that SL-PCMs by definition melt upon heating, these favorable material energy densities are reduced in practical applications where encapsulation and thermal conductivity enhancement is needed. More specifically, current solid-liquid TES rely on metallic fin structures, high thermal conductivity additives, and/or encapsulation to provide mechanical support, prevent molten PCM leakage, and enhance poor PCM thermal conductivity.

There are low-temperature solid-liquid metallic PCMs that have higher FOM values, include some which are close to and may exceed that of NiTi. These include Roto136F (FOM=2,603×10$^6$ $J^2$/Ksm$^4$) and Gallium (FOM=14,310×10$^6$ $J^2$/Ksm$^4$). While they exhibit promising FOM, these pose various integration issues and thus could be problematic. For example, Gallium is known to exhibit extreme undercooling, down to −183° C., and is incompatible with standard encapsulation materials such as Aluminum. As such, it is likely that Gallium would not re-solidify upon cooling in a hot water application and could catastrophically damage ancillary plumbing and pump equipment if leakage were to occur. Moreover, the use of metallic SL PCMs would require a detailed understanding of thermophysical properties (latent heat, specific heat, and thermal conductivity), the nature of melting phenomena in these materials (namely undercooling, segregation, and volume change), compatibility with different encapsulation materials, and additional changes in composition, microstructure, and thermal properties with repeated cycles. These aspects of metallic solid-liquid PCMs are generally not well understood, and their integration could be problematic.

The solid state Martensitic transformation phase change materials shown on the FOM plot of FIG. 5 include a range of NiTi-based SMA materials. They offer up to two orders of magnitude higher FOM relative to standard solid-solid PCMs and paraffin. The NiTi r.t. SS Martensite materials here have a comparable volumetric latent heat (ρ×L) to standard solid-solid PCMs and paraffin, however, they have significantly higher thermal conductivity $k_{HT}$.

Their transformation temperatures ranging from −50 to 500° C., latent heats up to 35.1 J/g, and Austenite thermal conductivities from 15.6 to 28 W/mK have been reported for various NiTi-based SMA materials in the literature. These properties are strongly dependent on the Ni and Ti balance, ternary elements, and/or thermomechanical processing. For binary alloys with decreasing atomic % Ni, 50.2 to 48.6%, Martensite start temperatures increase from −39 to 90° C. Following this trend, latent heats also increase with decreasing Ni content in binary NiTi alloys, evolving from 9 J/g at −39° C. to 27 J/g at 90° C. By fixing the Ni atomic % at 50% and replacing Ti with increasing amounts of Cr and V, up to 1.25% and 6% respectively, the Martensite start temperature and latent heats increase from 10 J/g to 30 J/g in the temperature range of −50 to 100° C. In NiTiCu ternary alloys, if the Cu atomic % is kept constant at 5% and the Ni content is decreased from 46.2 to 43 atomic %, the Martensite transformation temperature and latent heat increase from −21° C. and 14 J/g to 80° C. and 29 J/g. NiTi, NiTiCr, NiTiV, and NiTiCu offer large latent heats, but their performance is generally limited to temperatures below 100° C.

Unlike more traditional SMAs above, NiTiHf, NiTiPd, NiTiPt, NiTiAu, and NiTiZr offer higher temperature operation. While small changes of several percent are sufficient to provide meaningful changes in the Martensite start temperatures and latent heats in the low temperature alloys described above, the high temperature alloy systems require higher additions of ternary elements to provide meaningful changes. For example, a change from 2 atomic % Hf to 20 atomic % Hf (with 49.8 atomic % Ni) is necessary to move the transition temperature and latent heat from 103° C. and 29 J/g to 330° C. and 35 J/g.

It has been theorized that the general trend described here for different NiTi-based alloys, whereby the maximum latent heat increases with increasing transformation temperature, can be attributed to a composition-dependent destabilization of the high-temperature cubic B2 Austenite lattice. This is caused by the inability of Ni Antisite atoms to relax at high temperature, along with a stabilization of the monoclinic B19' Martensite structure. A thorough review of the impact of alloying, grain size and combined effects of heat treatment and precipitates on NiTi phase stability is outside the scope of the disclosure but has been covered in detail elsewhere. The shaded band on FIG. 4 represents the tunability afforded by solid-state Martensitic transformation (MT) PCMs by modifying the composition and alloys, opening up broader applicability for a range of low and high temperature applications. (The select tunability of the SS MT PCMs is further discussed below with respect to FIGS. 15A-15C).

Although originally associated with the transformation in quenched steels that leads to extraordinary increases in strength and hardness, and discussed here more specifically to shape memory alloys, martensitic transformations also occur in a number of minerals and ceramics. Reliant on similar solid-solid phase transformations, these materials, including steels, may additionally be used as solid-state phase change materials in context of the current invention.

Each of these sub-classes of SS MT PCMs have their own benefits as solid-state phase change materials. For example, ceramics are generally not conductive so they could be useful in environments where electrical isolation is needed. Metals, on the other hand, are electrically conductive and tend to have higher thermal conductivity and electrical conductivity, so they are more useful in applications requiring high rates of electrical and thermal transport. The thermal transfer fluid may be a liquid, vapor or gas.

This discussion and Table 1 are non-limiting and are meant to serve as a general tool for the selection and development of solid-state MT PCMs. System engineers and designer will need to weigh pros and cons of respective solid-state material systems when designing TES systems.

Figure 6A:
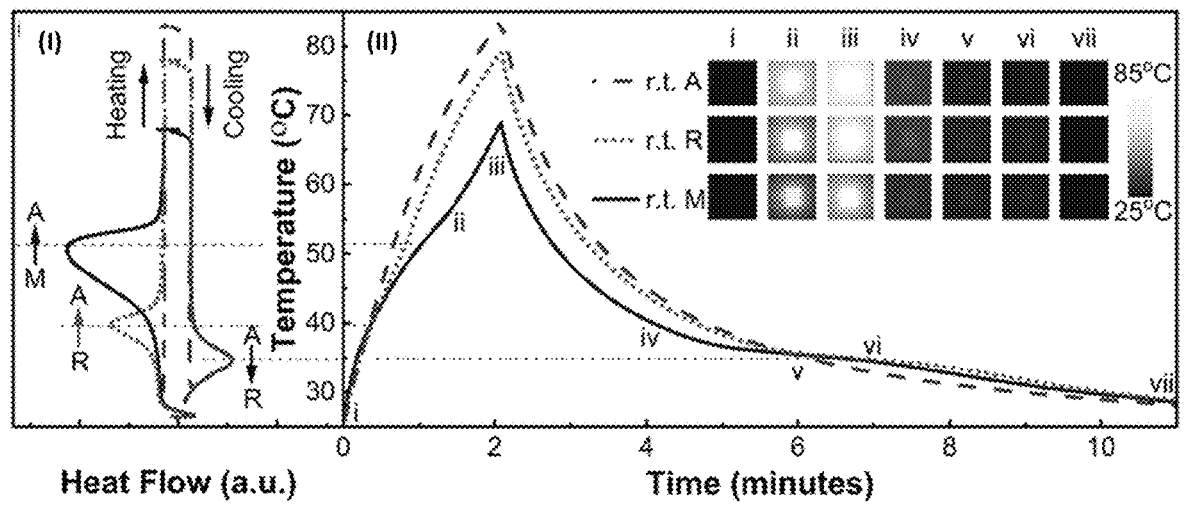
FIG. 6A shows differential scanning calorimetry (DSC) and Joule-heating results for simulated thermal energy storage application using NiTi, one solid state Martensitic transformation phase change material.

FIG. 6A shows differential scanning calorimetry (DSC) and Joule-heating results for simulated thermal energy storage application using NiTi, one SS Martensitic transformation PCM. The DSC performed on the r.t. Austenite NiTi specimen, shown in the left image (I) of FIG. 6A, returned a constant heat flow versus temperature curve, confirming that no phase transformation occurs during heating and cooling in the temperature regime being investigated. The DSC results for the r.t Martensite specimen revealed the Martensite→Austenite transition during heating at a peak transformation temperature of 51° C. The measured endothermic latent heat was 13.46 J/g. Upon cooling, the reverse Austenite→intermediate R-phase transformation occurred at a temperature of 35° C., resulting in a latent heat release of 4.6 J/g.

The r.t. R-phase sample demonstrated an R-phase→Austenite transition during heating at a peak transformation temperature of 40° C., 11° C. lower than the observed Martensite→Austenite transformation. The measured endothermic latent heat for the R-phase→Austenite transition was 4.54 J/g, roughly 33% lower than the Martensite→Austenite transformation. Similar to the r.t. Martensite test, the reverse Austenite→R-phase transition occurred in the r.t. R-phase sample at a temperature of 35° C. and released 4.60 J/g. R-phase was confirmed using the PANalytical X'Pert3 MRD system.

The result of one constant-power Joule-heating experimental cycle is shown in the right image (II) of FIG. 6A. Initially, all samples started at room temperature (25° C.) and embarked on rapid sensible heating once the power was supplied. An inflection point was observed in the r.t. Martensite and r.t. R-phase samples at a temperature of 35-40° C., corresponding with the start of the Martensite→Austenite and R-phase→Austenite solid-solid phase transformations, shown in left image of FIG. 6A. Additional inflection points during heating can be seen at 45° C. and 57° C., corresponding with the end of the R-phase→Austenite and Martensite→Austenite transitions, respectively. After the phase transformations were exhausted, the r.t. Martensite and r.t. R-phase sample temperatures began tracking parallel to the r.t. Austenite curve as all materials sensibly heated. The r.t. Austenite sample reached a maximum temperature of 83° C. The r.t. R-phase material had a repeatable maximum temperature of 78° C., while the r.t. Martensite sample did not exceed 68° C. This represents 5-15° C. cooling, or a 9-25% reduction in the maximum temperature rise.

Upon passive cooling, the r.t. Austenite material responded in a characteristic exponential decay to room temperature. The r.t. Martensite and r.t. R-phase materials sensibly cooled from their maximum observed temperatures to 40° C., then underwent the reverse Austenite→R-phase transformation. This resulted in a clear non-linear temperature response and, briefly, hotter r.t. Martensite and r.t. R-phase materials. All samples recovered to room temperature at the end of the thermal cycle.

It is clear from this side-by-side analysis of the left and right images (I) and (II) of FIG. 6A, that the non-linear temperature response during Joule-heating corresponds to endo- and exotherms in the DSC data. This proves that the temperature response during heating and cooling is a result of the observed phase transformations. Furthermore, these results show that the Martensite→Austenite phase transformation absorbed three times more energy and provided three times higher temperature suppression than the R-phase→Austenite transition. However, despite lower latent heat and temperature suppression, the R-phase transformation offers the benefit of smaller thermal hysteresis. This effect is well documented in the literature and offers improved design and operation flexibility depending on particular application requirements.

Figure 6B:
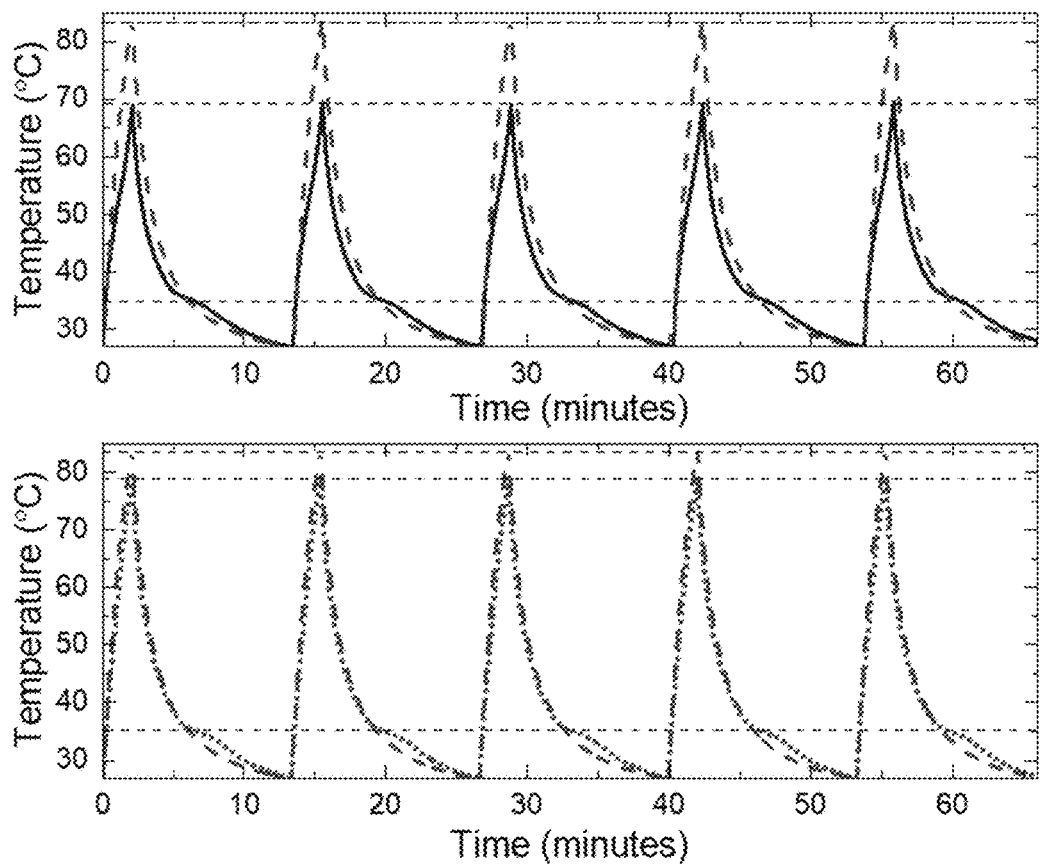
FIG. 6B shows five repeated Joule-heating cycles with the NiTi material.

FIG. 6B shows five repeated Joule-heating cycles with NiTi material, one SS Martensitic transformation PCM. As shown, the results are near-identical, with minor variations from one cycle to the next, but lacking a clear trend (either increasing or decreasing) as the number of cycles increases. This is a preferred outcome for real-world scenarios where cyclic stability is required for sustained performance over repeated cycles.

Figure 7:
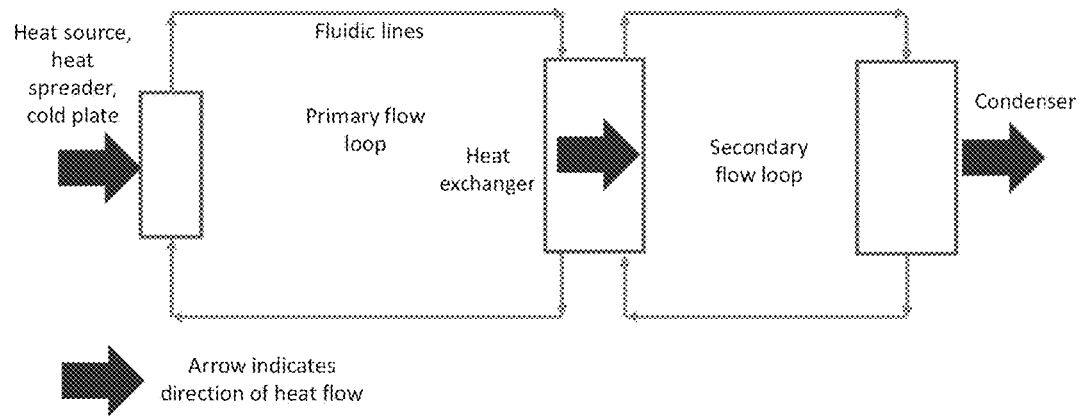
FIG. 7 shows a schematic diagram of a multi-loop cooling architecture depicting heat generation at a heat source, spreading in a heat spreader, transfer to a fluid in a cold plate, relocation via fluidic lines, transfer to another fluid via a heat exchanger, and finally rejection to air via condenser/radiator, according to embodiments.

FIG. 7 shows a schematic diagram of a multi-loop cooling architecture depicting heat generation at a heat source, spreading in a heat spreader, transfer to a fluid in a cold plate, relocation via fluidic lines, transfer to another fluid via a heat exchanger, and finally rejection to air via condenser/radiator, according to embodiments. This architecture has been adopted by some Directed Energy applications, and each component described herein offers an opportunity for incorporation of solid-state MT PCM material(s). FIGS. 8-12 depicts various heat exchange components which may be incorporated in the multiple cooling architecture of FIG. 7 in accordance with various embodiments.

In some embodiments, as shown in FIGS. 8B, 9B, 10B, 11B and 12B, the heat exchange component may additionally incorporate a solid-to-liquid and/or liquid-to-vapor/gas phase change material. Some common solid-to-liquid (SL phase change materials which may be used) include, but are not limited to, organic SL materials (e.g., paraffin, 1-octadecanol or erythritol), metallic SL materials (e.g., gallium, indium or Fields metal), and Salt Hydrates (e.g., lithium chlorate, sodium sulfate, or sodium hydroxide monohydrate). Liquid-vapor PCMs may include water, ammonia, chemical refrigerants (e.g., Freon, R-132, or the like), etc. For example, a typical micron-sized shell-core encapsulation could be used to first prepare the solid-liquid PCM before integration into a combined solid-liquid and solid-solid module.

Figure 8A:
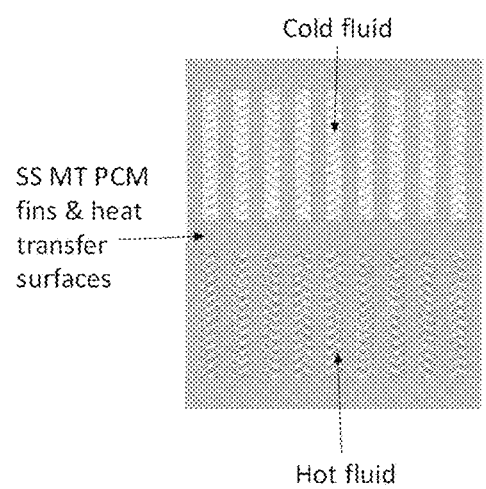
FIGS. 8A and 8B show schematic diagrams of a solid-state Martensitic transformation PCM heat exchanger and a combined solid-state MT phase change and solid-liquid phase change material heat exchanger, respectively, in accordance with embodiments.
Figure 8B:
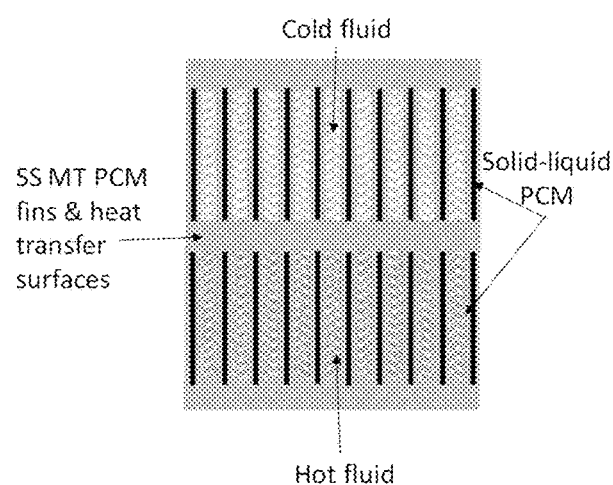

FIGS. 8A and 8B show schematic diagrams of a solid-state Martensitic transformation PCM heat exchanger and a combined solid-state MT phase change and solid-liquid phase change material heat exchanger, respectively, in accordance with embodiments. Because the solid-state MT PCMs described herein are robust, mechanically stable, high conductivity materials, it is possible to eliminate the need for high conductivity fins, base plates, and lids in traditional designs. Here, solid-state PCMs serve as both the PCM material and heat transfer surfaces. Walls of PCM separate hot and cold fluid streams and serve as conductive surfaces for heat transfer from one fluid into another. As shown in FIG. 8B, the use of solid-state MT PCMs does not preclude the incorporation of traditional solid-liquid or liquid-vapor PCMs.

FIGS. 9A and 9B show schematic diagrams of a solid-state Martensitic transformation PCM heat spreader and a combined solid-state MT phase change and solid-liquid or liquid-vapor phase change material heat spreader, respectively, in accordance with embodiments. Because the solid-state MT PCMs described herein are robust, mechanically stable, high conductivity materials, it is possible to attach heat sources such as electronic die or photonic sources directly to serve as a heat spreader and thermal energy storage solution. As shown in FIG. 9B, the use of solid-state MT PCMs does not preclude the incorporation of traditional solid-liquid or liquid-vapor PCMs.

FIGS. 10A and 10B show schematic diagrams of a solid-state Martensitic transformation phase change heat sink or cold plate and a combined solid-state MT phase change and solid-liquid or liquid-gas heat sink, respectively, in accordance with embodiments. Here, the solid-state MT PCMs serve as both the PCM material and high conductivity heat transfer surfaces and fluidic channels. Walls of PCM contain coolant or heating fluid streams and serve as conductive surfaces for heat transfer from a heat source to a fluid. As shown in FIG. 10B, the use of solid-state MT PCMs does not preclude the incorporation of traditional solid-liquid or liquid-vapor PCMs into cold plates and heat sinks.

By contrast, most standard state-of-the-art PCM heat sinks use a low thermal conductivity solid-liquid PCM, metallic lid, base, and fins. Due to the low thermal conductivity and fact that traditional PCM materials melt upon heating, standard designs need high conductivity fins and lid structures to facilitate heat flow into and out of the PCM and also encapsulate the material. Typically, the metallic structures account for half of the total mass of the system, meaning only half of a typical design is made of PCM material. This simultaneously increases the size and weight of a standard solution, and reduces the volumetric- and mass-specific latent energy density. Air gaps must be left in the structure to allow for expansion during melting, which typically involves a volumetric expansion of 15%, further reducing the volumetric energy density.

FIGS. 11A and 11B show schematic diagrams of a solid-state Martensitic transformation phase change condenser/radiator and a combined solid-state MT phase change and solid-liquid or liquid-gas condenser/radiator, respectively, in accordance with embodiments. Here, solid-state MT PCMs serve as both the PCM material and high conductivity heat transfer surfaces and fluidic channels. Walls of SS MT PCM contain coolant or heating fluid streams and serve as conductive surfaces for heat transfer from a hot fluid stream to air (or a cooler fluid). As shown in FIG. 11B, the use of solid-state MT PCMs does not preclude the incorporation of traditional solid-liquid or liquid-vapor PCMs into cold plates and heat sinks.

Figure 12A:
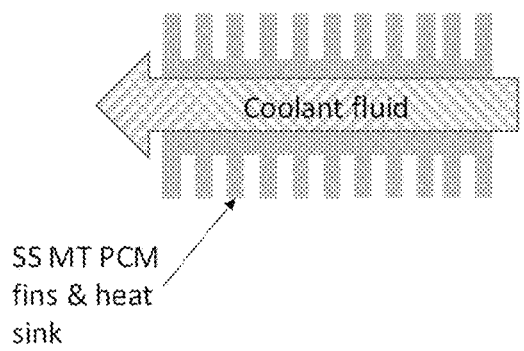
FIGS. 12A and 12B show schematic diagrams of a solid-state Martensitic transformation phase change fluidic channel and a combined solid-state MT phase change and solid-liquid or liquid-gas fluidic channel, respectively, in accordance with embodiments.
Figure 12B:
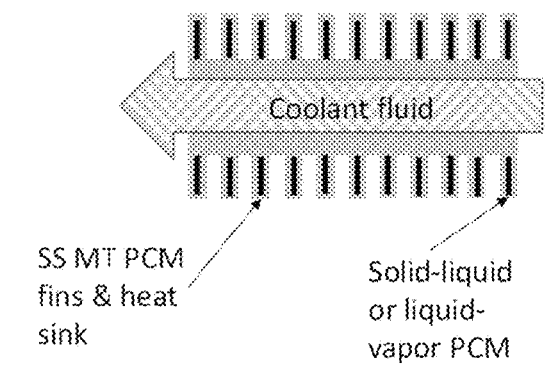

FIGS. 12A and 12B show schematic diagrams of a solid-state Martensitic transformation phase change fluidic channel and a combined solid-state MT phase change and solid-liquid or liquid-gas fluidic channel, respectively, in accordance with embodiments. Here, solid-state MT PCMs serve as both a PCM material and fluidic channel to allow fluid flow from one location to another. As shown in FIG. 12B, the use of solid-state MT PCMs does not preclude the incorporation of traditional solid-liquid or liquid-vapor PCMs into cold plates and heat sinks. This allows, broadly speaking, fabrication of ancillary components such as tubes, fluidic connectors, mechanical supports, etc. to be fabricated out of PCMs via solid-solid PCM materials.

For various embodiments, the operational temperatures may be as follows: (a) domestic or commercial refrigeration system (typical −20 to 5° C.); (b) domestic or commercial building heating or cooling system (typical 5 to 40° C.); (c) solar-based heating, hot water, and electronic cooling application (typical 40 C to 80° C.); and (d) absorption cooling, waste heat recovery, or electricity generation system (typical 80° C. and higher). These examples are merely exemplary and non-limiting.

Figure 13:
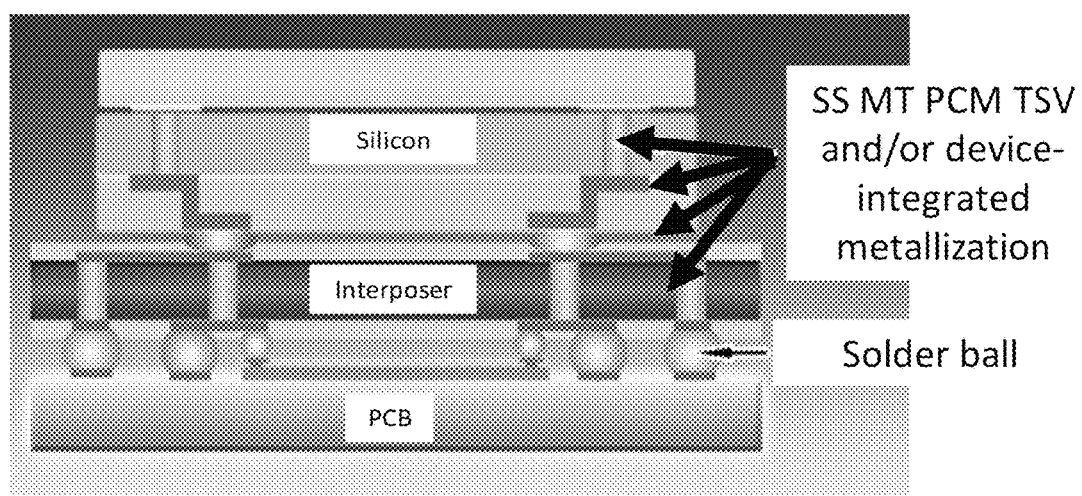
FIG. 13 shows a schematic diagram of incorporation of a solid-state Martensitic transformation phase change material into an electronic or photonic device's metallization layers in accordance with embodiments.

FIG. 13 shows a schematic diagram of incorporation of a solid-state Martensitic transformation phase change material into an electronic or photonic device's metallization layers. Here, metallic solid-state MT PCMs serve as both conduits for electrical connectivity within the device, and also a means for device-integrated transient thermal management. This can be accomplished near the junction, in metallic traces, in wirebonds, and in solder bonds. As shown in the figure, heat is generated as a byproduct in the Si or device layer and removed down through the PCB. Incorporating metallic SS MT PCMs as the metallization layers, or perhaps ceramic SS MT PCM materials as the semiconductor or substrate layers provides transient thermal management closer to the heat source. This would allow fast transient response not possible with cold plates, heat exchangers, and other components further downstream.

As described above, there are drawbacks to the conventional solid-liquid PCMs and the approach to designing TES systems. In addition to high Figure of Merit of solid-solid Martensitic transformation PCMs, as previously described, additional practical benefits of the disclosed solid-solid (solid state) TES embodiments in FIGS. 8-13 are as follows:

Using SS Martensitic transformation PCMs, eliminates voids associated with intermittent melt-thaw cycles of conventional solid-liquid PCMs. Additionally, by using of SS Martensitic transformation PCMs, eliminates voids associated with high surface energy, high surface tension, and poor wetting in the case of conventional metal-liquid PCMs. SS SMA Martensitic transformation PCMs, which some embodiments may use, do not need to melt to absorb latent heat, so system complexities associated with liquid containment and expansion are eliminated. Also, SS SMA Martensitic transformation PCMs, which some embodiments may use, are immune from phase segregation and settling, which is a susceptibility of PCM solutions or mixtures that go into a liquid phase. There is a reduction in packaging complexity when dealing with a solid-solid Martensitic transformation PCM, especially, SS SMA MT PCM. While most PCM materials have a fixed melting temperature, SS SMA MT materials can be compositionally tuned to undergo the solid-solid phase transformation at temperatures ranging from 4K to 500° C., with other metal, metal alloys, and ceramics having higher temperatures. SS MT PCM materials can be fabricated using Additive Manufacturing (AM), opening the door to direct integration of solid-solid MT PCM materials to form factors suitable for TES without additional post-processing. The AM capabilities also open the door for homogeneous/heterogeneous/functionally graded integration of SS MT PCM TES materials but changing system process parameters and material composition. SS SMA materials are widely regarded for their biocompatibility and strength, so integration into TES applications and for use as combined TES/structural elements is possible. SMA materials are widely used as actuators, so combined thermal actuator/TES is possible. Some SMA materials have demonstrated very low thermal hysteresis upon subsequent heating and cooling (minimal supercooling), which is a known issue with standard PCM materials. The solid-solid phase change in SMAs is a fast/congruent first-order phase transformation, allowing TES for fast transients (such as those seen in electronic applications). SMA materials are Restriction of Hazardous Substances (RoHS)-compliant and the constituents to make these materials are abundant. Unlike many paraffin and polymer-based solid-solid PCMs which have low thermal conductivity, SS MCT SMA PCM materials (metal alloys) inherently have high thermal conductivity. This makes heat transport and removal in these materials much better. SMA materials (and metal alloys) have relatively high specific gravity, resulting in smaller PCM volume for a given heat storage. This allows miniaturization and SWaPC (Size, Weight, Power and Cooling) improvements when designing TES systems.

Figure 14:
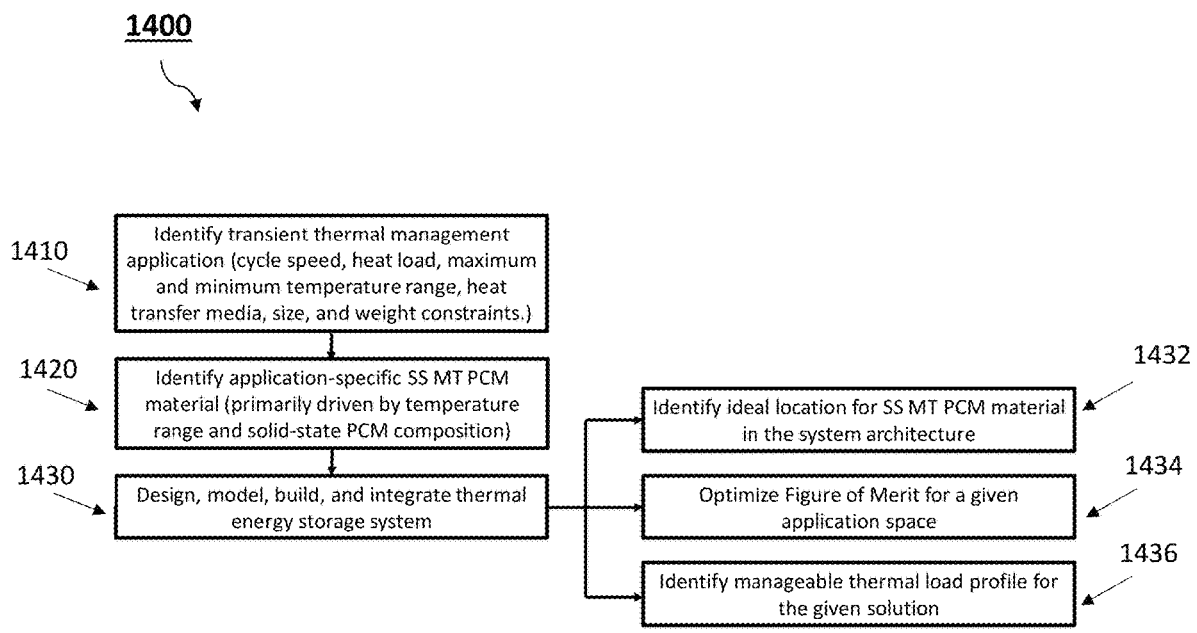
FIG. 14 is a flow diagram illustrating a method for designing a heat exchange component (or components) formed of a solid-state Martensitic transformation PCM in accordance with embodiments.

FIG. 14 is a flow diagram illustrating a method 1400 for designing a heat exchange component (or components) formed of a solid-state Martensitic transformation PCM. The first step 1400 includes first identifying a transient thermal management or thermal energy storage application (e.g., cycle speed, heat load, maximum and minimum temperature range, heat transfer media, size, and weight constraints). These applications are ordinarily composed of one or more heat exchange components.

The next step 1420 includes identifying application-specific SS Martensitic transformation PCM material (e.g., primarily driven by temperature range and resultant solid-state PCM composition as previously described) for a component thereof. And, step 1430 involves designing, modelling, building, and/or integrating thermal energy storage material and system. The latter step involves sub-step 1432 for identifying an ideal location (or multiple locations) for heat exchange components formed of PCM material in the system architecture, as described generally by FIGS. 8-13; sub-step 1434 to optimize PCM figure of merit for a given application space and heat exchange component; and sub-step 1436 to identify manageable thermal load profile for a given solution to inform system designers of system operation capabilities and limitations.

Once the design variables have been determined, the heat exchange component(s) can be fabricated according to well-known design principals for heat exchangers. Please refer to the "Heat Exchanger Design Handbook" by K. Thulukkanam, "Compact Heat Exchangers: Selection, design, and Operation" by J. E. Hesselgreaves, and "Contemporary Perspectives in Liquid Cold Plate Design: Design and Manufacturing Liquid Cooled Heat Sinks for Electronics Cooling" by C. Hayner, (herein incorporated by reference) among other highly-cited and readily available resources on thermal structure design and fabrication.

The heat exchange components according to embodiments may be fabricated using various techniques, such as, by stamping, folding/bending, casting, forging, rolling, shearing, punching, blazing, welding, machining, additive manufacturing, and/or others as are generally known in the art. Metallurgical or ceramic forming techniques may also be employed; to consolidate powdered metals of ceramic, sintering and firing, may be used.

Figure 15A:
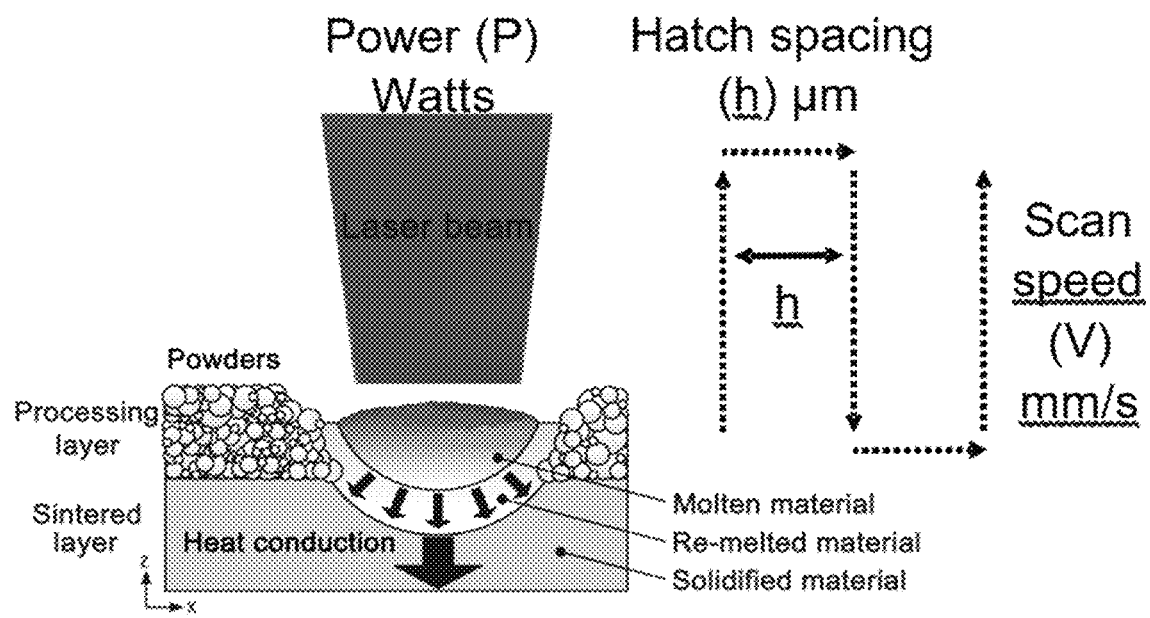
FIGS. 15A, 15B and 15C show how the properties of SS MT PCMs can be tuned according to embodiments.
Figure 15B:
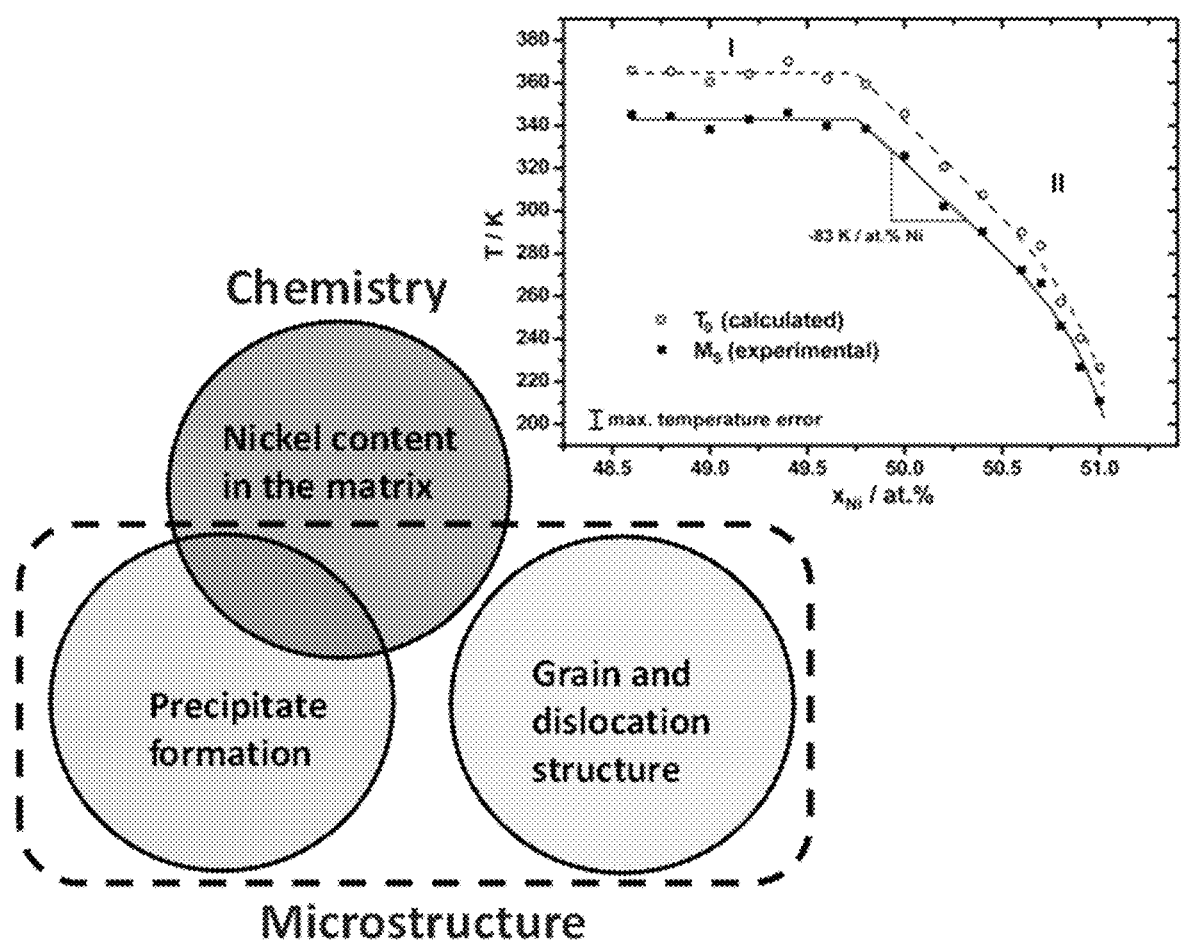
Figure 15C:
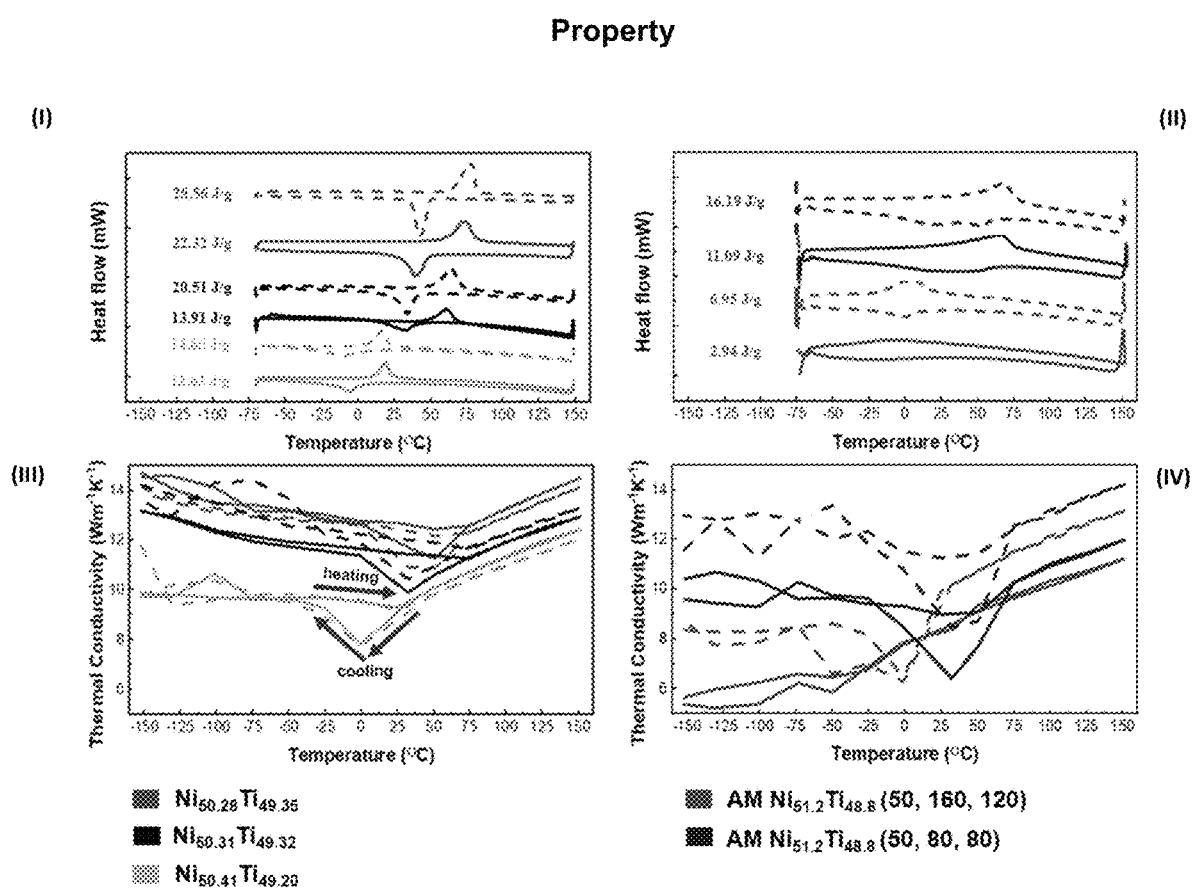

FIGS. 15A, 15B and 15C show how the properties of SS MT PCMs can be tuned according to embodiments. In contrast to conventional engineering alloys, small changes in the processing parameters of SS MT PCMs can result in amplified variations in the transformation characteristics and mechanical strength. For instance, transformation temperatures of Ni-rich NiTi SS MT PCMs can change as much as 20° C. per 0.1 at. % Ni change above 50 at. %. These functional changes are related to changes in the local microstructure and the chemistry of the alloy caused by differences in the temperature history during processing. This relationship, more generally known as the "process-structure-property" relationship is detailed in the progression of FIGS. 15A-15C.

By controlling the local heating rate (in this case using a laser to control laser power, hatch spacing, and/or scan speed) the SS MT PCM microstructure and chemistry can be changed either locally or globally, and it is possible to achieve heterogeneous properties in a monolithic SS MT PCM material. Alternatively, heating could be performed in a furnace or with a localized heater.

FIG. 15A shows an example of this tuning. In these examples, Additive Manufacturing (AM) printing experiments were conducted with a 3D Systems ProX 200™ laser powder bed fusion (L-PBF) system, equipped with a fiber laser beam having a Gaussian profile, wavelength λ=1070 nm, beam spot size of approximately 80 μm in diameter, and a maximum power of 260 W. The experiments were carried out under a protective atmosphere of argon during fabrication. Gas atomized $Ni_{51.2}Ti_{48.8}$ (at. %) powder was acquired from Nanoval GmbH (Germany) for these samples. The average particle size was $d_{50}$=20.5 μm where $d_{xx}$ denotes the cumulative size percentile of particles that have diameters equal to the number provided. 800° C.-1 hr solution heat treated powder was austenitic at room temperature and exhibited no martensitic transformation during cooling down to −150° C.

$Ni_{51.2}Ti$ 48.8 samples were printed using two different sets of processing parameters: the first set of parameters was (P(W), V(mm/s), h(μm))=(50, 80, 80), while the second was (P(W), V(mm/s), h(μm))=(50, 160, 120), where P is the laser power, V is the scanning speed and h is the hatch spacing (the distance between two adjacent passes of the laser beam within the same layer). The layer thickness during both prints was set to 30 μm. The former set of parameters resulted in an as-fabricated martensitic structure at room temperature, while the latter resulted in an austenitic structure at room temperature; these parts will be referred to henceforth as 'M. r.t.' and 'A r.t.'. 25.4×25.4 mm² squares were printed with a thickness of 3 mm on a NiTi substrate plate to minimize the coefficient of thermal expansion mismatch and reduce delamination. Following printing, squares were cut off the base plate using wire electrical discharge machining. As-fabricated additive samples were either tested as-is or heat treated at 500° C. for 1 hour prior to testing.

As a point of comparison, three different bulk materials, $Ni_{50.28}Ti_{49.36}$, $Ni_{50.31}Ti_{49.32}$, and $Ni_{50.41}Ti_{49.20}$, (all in at. %) were purchased from EdgeTech Industries, LLC. These materials were tested as-received, and also solution heat treated at 850° C. for 10 minutes to promote grain growth and recrystallization. Testing these unique samples allowed us to distinguish the effect of composition, manufacturing technique, and to some extent the post-processing heat treatment on latent heat, thermal conductivity, and overall thermal performance.

As depicted in FIG. 15B, the processing in FIG. 15A alters the nickel content in the alloy matrix, precipitate formation, and/or grain and dislocation structure. As shown in inset plot in FIG. 15B, the transformation temperatures of Ni-rich NiTi SS MT PCMs can change as much as 83° C. per 1 at. % Ni change above 50 at. %. Below 50%, the transformation temperature tends to saturate to nearly 100° C. These functional changes are related to changes in the local microstructure and the chemistry of the alloy caused by differences in the temperature history during processing. For example, since Ni has a lower vapor pressure than Titanium, heating preferentially evaporates Ni, which may lead to a lower Ni concentration and a higher transformation temperature. Likewise, heating can promote the formation of Ni-rich precipitates (namely $Ni_4Ti_3$) which, in a similar fashion, depletes the matrix of Ni and raises the transformation temperature. Heating is also known to promote changes in grain and dislocation structure, such as grain size and texture, which may affect salient thermal characteristics such as latent heat, thermal conductivity, transformation temperature, and hysteresis.

The resultant properties of these process control experiments are shown in FIG. 15C. In particular, plot (I) in FIG. 15C shows DSC results for the bulk NiTi SS MT PCMs. The higher Ni content resulted in lower transformation temperature, varying from 90° C. for $Ni_{50.28}Ti_{49.36}$ to 20° C. for $Ni_{50.41}Ti_{49.20}$. The latent heat also showed an inverse relationship with increasing Ni content. In other words, higher transformation temperature materials exhibited higher latent heat. Furthermore, the solution anneal process proved useful for increasing the observable latent heat; increasing by as much as 47%, as was the case for $Ni_{50.31}Ti_{49.32}$. Plot (II) in FIG. 15C shows the measured thermal conductivity values corresponding to the as-received and solution annealed bulk samples during one heating (from −150° C. to 150° C.) and cooling (from 150° C. to −150° C.) cycle in a commercial DXF tool. Similar to the latent heat trends, there appears to be a positive relationship between transformation temperature and thermal conductivity, with $Ni_{50.28}Ti_{49.36}$ outperforming the others for the full range of temperatures tested. As shown in plot (III) of FIG. 15C, the choice of tighter hatch spacing and slower scan speed resulted in higher transformation temperature in the M r.t. sample; it has been demonstrated in the literature that this is due to higher overall laser fluence, which leads to preferential evaporation of Nickel. In turn, the part has less Nickel remaining and the transformation temperature increases, as described previously. Additionally, the choice of post-process heat treatment greatly impacts the quality of the phase transformation in the additive materials. While the heat treatment did not appear to significantly change the transformation temperature, it did result in a larger observed latent heat, as well as sharper peaks; this is clear in the case of the A r.t. sample. Similar to the bulk materials, higher latent heat had a positive correlation with transformation temperature. Plot (IV) in FIG. 15C shows the thermal conductivity values for the same additive samples. Again, there is an observed positive relationship between thermal conductivity and transformation temperature. The prescribed 500° C. heat treatment increased the thermal conductivity by 25%, resulting in thermal conductivity values comparable to the bulk material equivalents. 500° C. heat treatments are known to promote $Ni_4Ti_3$ precipitates, which would be expected to introduce scattering sites and reduce bulk thermal conductivity. However, the results are contrary to these expectations.

Clearly, the control of Ni-content and local heating (in this case using laser additive manufacturing) can be used to control parameters of interest for thermal energy storage, namely thermal conductivity, transformation temperature, and thermal conductivity. This tailorability provides unprecedented local and global control over material performance, and offers significant benefits over standard PCMs that represent "point solutions."

Examples: Solar Heat Exchanger: SS MT PCM Vs. Conventional PCM Materials

Figure 16:
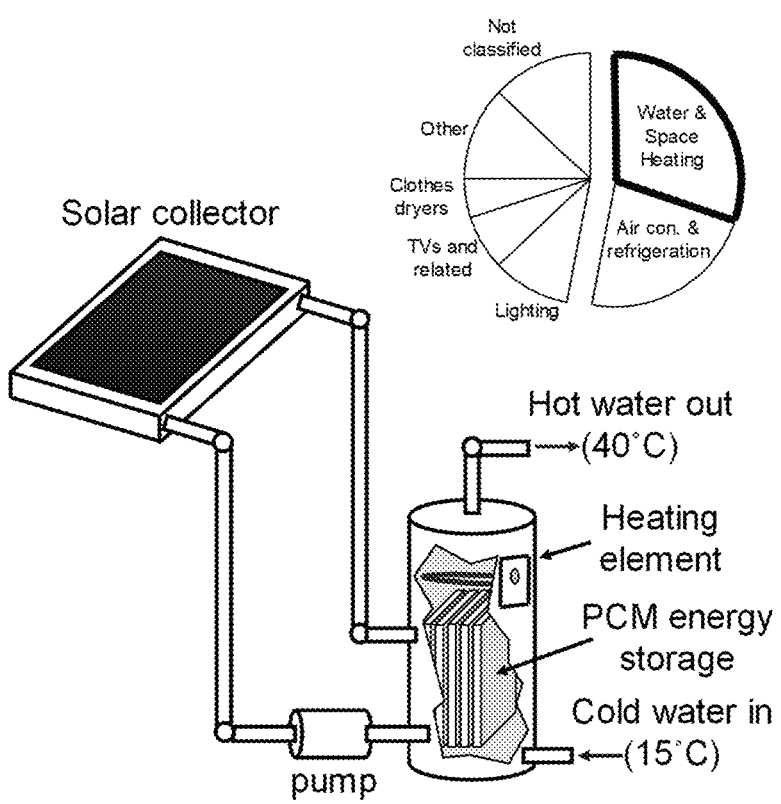
FIG. 16 shows a hot water supply for which exemplary heat exchange components were designed according to embodiment.

Because solar energy is intermittent, and peak demand for hot water does not always coincide with peak supply, TES is a key enabling technology for a solar hot water application shown in FIG. 16. Note: this analysis can be extended to applications such as Directed Energy, high power electronic, or any number of TES applications and is meant here for illustrative purposes. The temperature range of interest for residential and commercial heating and cooling equipment is 5° C. to 80° C.

As shown in FIG. 16, a desired maximum temperature for residential hot water supply is nearly 40° C. and generally won't exceed 80° C. for the full range of residential and commercial heating equipment. Furthermore, it can be assumed that incoming supply water is 15° C. As such, materials should be selected with exothermic phase transitions near 40° C. with the extent of the endothermic and exothermic phase transformations residing between 15° C. and 80° C. Beyond transformation temperature, PCM criteria such as latent heat and thermal conductivity are critically important for storage and heat transfer in these materials. The former drives the total energy storage and the latter dictates the ability to charge and discharge thermal energy. Therefore, these salient properties should be considered when down-selecting materials prior to module fabrication.

Three different compositions of nickel titanium, $Ni_{50.28}Ti_{49.36}$, $Ni_{50.31}Ti_{49.32}$, and $Ni_{50.41}Ti_{49.20}$, which represent the most well-known material exhibiting the shape memory effect (Martensitic transformation) were purchased to determine the impact of composition on latent heat, transformation temperature, and thermal conductivity. Trace impurities are also present, accounting for the remainder of the chemical balance, but because they represent a very small percentage of the atomic % their presence is not noted in the chemical descriptions. The NiTi materials were fabricated in a rolled sheet form and were solution heat treated at 850° C. for 10 minutes then water quenched to promote recrystallization and grain growth. 1-Octadecanol was selected as the SL-PCM and Aluminum-6061 was used as the material for the sensible heating module. 1-Octadecanol, an organic PCM material in the same class as paraffin, is widely available, melts congruently, is thermally stable, transforms within the desired temperature range, and does not harbor environmental, personal, or compatibility risks.

Figure 17A:
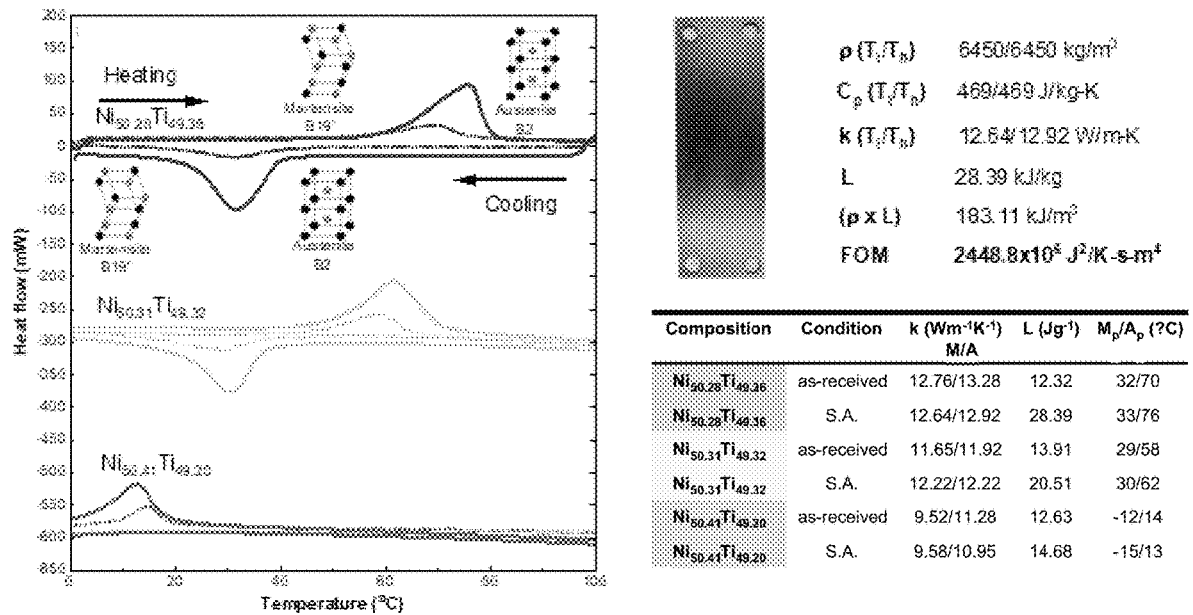
FIGS. 17A, 17B and 17C show elements of the design of the heat exchange components.
Figure 17B:
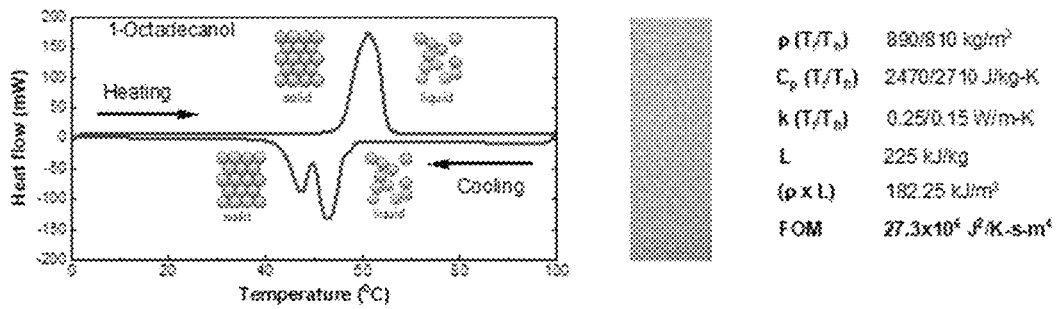
Figure 17C:
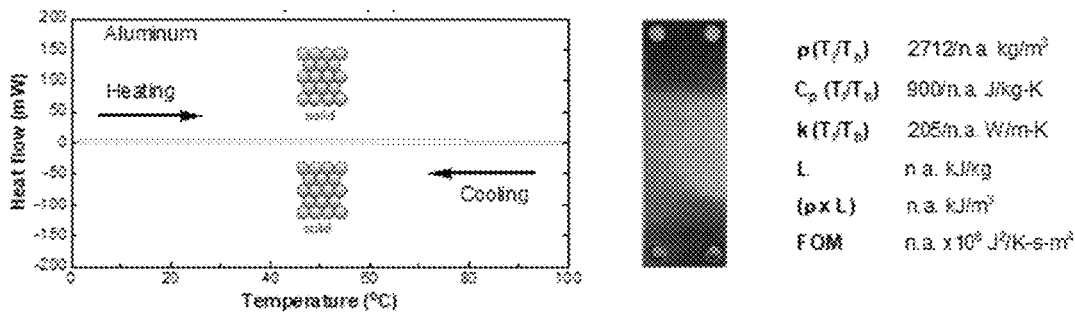

FIGS. 17A, 17B and 17C show elements of the design of the heat exchange components. Differential Scanning calorimetry (DSC) was carried out for all samples using a Perkin-Elmer 8500 DSC to determine latent heat and transformation temperature. Samples were stabilized for 5 minutes to within ±0.1° C. of the set-point start temperature of 0° C. After stabilizing, the samples were ramped at a rate of 10° C./min to a maximum temperature of 100° C., and then cooled at a rate of 10° C./min back to 0° C.

DSC results for the as-received and heat treated $Ni_{50.28}Ti_{49.36}$, $Ni_{50.31}Ti_{49.32}$, and $Ni_{50.41}Ti_{49.20}$ materials are shown in FIG. 17A and summarized in the adjacent table. As expected, higher Ni content resulted in lower transformation temperature, varying from Austenite peak ($A_p$) temperatures of 76° C. for $Ni_{50.28}Ti_{49.36}$ to 13° C. for $Ni_{50.41}Ti_{49.20}$. Both $Ni_{50.28}Ti_{49.36}$ and $Ni_{50.31}Ti_{49.32}$ provide full transformations in the desired temperature range of 15° C. and 80° C. The latent heat showed an inverse relationship with Ni content, meaning higher transformation temperature corresponded with higher latent heat. Furthermore, the solution anneal process proved useful for increasing the measured latent heat with no significant impact on transformation temperature. In the case of $Ni_{50.28}Ti_{49.36}$, the latent heat was shown to increase by 230%, from 12 to 28 J/g. The thermal conductivity, calculated from the diffusivity assuming a density of 6450 kg/m³ and specific heat of 469 J/kgK, for all NiTi compositions at a temperature of 0° C. (Martensite phase) and 100° C. (Austenite phase) are listed in sub-figure of FIG. 17A.

As shown by the DSC results in FIG. 17B, 1-octadecanol has an exothermic transformation in the temperature range of interest (ending near 40° C.) and a favorable mass-specific latent heat of 225 kJ/kg (182.25 MJm⁻³). Unsurprisingly, as shown in FIG. 17C, Aluminum revealed no transformation in the temperature range tested. Thermal conductivity values for 1-octadecanol (0.25 to 0.15 W/mK) and aluminum 6061 were taken from the literature and are listed on the right side of FIGS. 17B and 17C.

Both $Ni_{50.28}Ti_{49.36}$ and $Ni_{50.31}Ti_{49.32}$ can be used effectively as SS MT PCMs for the current application, but the solution heat treated $Ni_{50.28}Ti_{19.36}$ offers the highest latent heat (28.30 vs 20.51 J/g) and highest thermal conductivity (12.92 vs 12.22 W/mK) of the two. Based on these results, solution heat treated $Ni_{50.28}Ti_{49.36}$ was chosen as the solid-state material to be used in the thermal energy storage unit for these examples. It is worth noting that $Ni_{50.41}Ti_{49.20}$ would not be an appropriate choice because it lacks a full transformation in the specific temperature range. Nonetheless, this characterization demonstrates a key benefit of the class of material: the ability to tailor transformation temperature, latent heat, and thermal conductivity by altering chemical composition and heat treatment.

As shown, NiTi-based alloys, including the commercially-available material tested herein, offer up to two orders of magnitude higher figure of merit relative to standard polymeric solid-solid and solid-liquid PCMs.

Figures 18A, 18B, 18C, 18D:
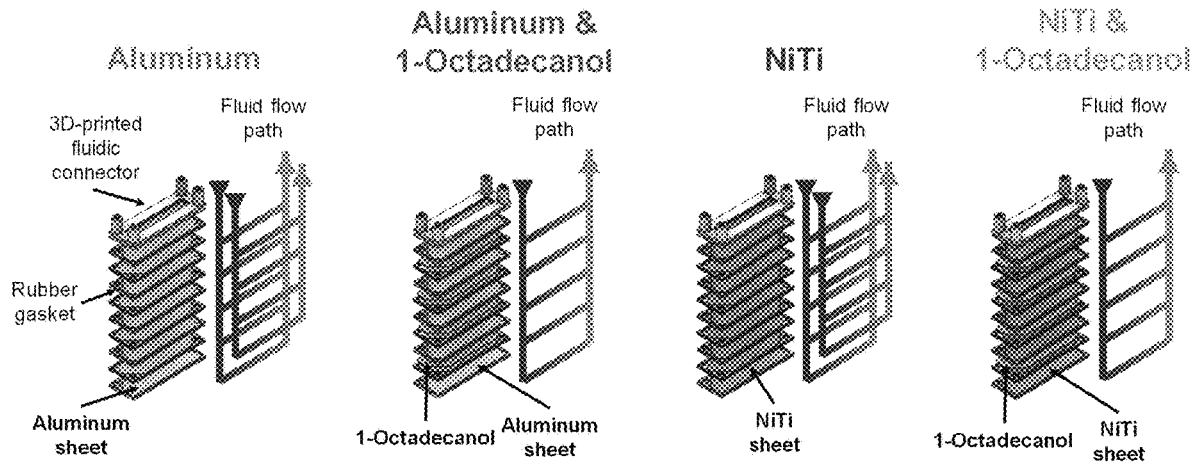
FIGS. 18A, 18B, 18C and 18D show various designs for heat exchange components.

The energy storage module design employed here is modeled after parallel-plate heat exchangers frequently used in commercial, domestic, and military hot water applications. Using the aforementioned materials, four different parallel plate thermal energy storage modules can be considered for this study, as shown in FIG. 18A for 1) a ten plate aluminum sensible energy storage module, FIG. 18B for 2) the same aluminum module with 1-octadecanol organic SL-PCM filled in the space between adjacent aluminum plates, FIG. 18C for 3) a solid-state PCM module made out of solution heat treated $Ni_{50.28}Ti_{49.36}$, and FIG. 18D for 4) a composite latent energy storage module with 1-octadecanol in the space between adjacent solution heat treated $Ni_{50.28}Ti_{49.36}$ plates. The first two cases represent standard sensible and SL approaches with encapsulation/fins, while the latter two show potential embodiments of the current invention using Martensitic transformations.

In all cases, the Aluminum and NiTi metal sheets were 1 mm thick, 50.8 mm wide, and 152.4 mm long. A metal punch was used to create 9.525 mm (⅜") holes in the corners of the metal sheets for fluidic distribution. Gaskets were cut from 1.5 mm thick gasket rubber and assembled to allow encapsulation of PCM between alternating channels. Fluidic connectors were fabricated using a Stratasys FDM 3D printer. All modules were assembled using a thin coating of Permatex UltraCopper RTV on the gasket material to ensure a robust fluidic seal. The modules containing 1-octadecanol were first fabricated and tested, then placed in a furnace at 90° C. (well above the 1-octadecanol melting temperature) for 2 hours to thermally equilibrate. Finally, 41 mL (33.2 g) of molten 1-octadecanol was poured into each of the heated TES modules and allowed to cool overnight to room temperature. Additional fabrication methods such as 'gasketed plate-and-frame', brazing, additive manufacturing (3D printing) of monolithic materials, welding, and solder, may be used to accomplish the same goals of attachment, fluid containment, and/or PCM containment. There fabrication example here is merely an example and should not be limiting.

Table 2 shows the salient features of each fabricated thermal energy storage module, including estimated energy storage capacities for a temperature change of 65° C. This range was chosen to cover the primary range for solar hot water applications described previously, from 15° C. to 80° C. The total volume of each module was kept constant at 187.5 cm³ to allow side-by-side comparisons of volumetric energy storage. The heat transfer area was 1342.2 cm² for the Aluminum and NiTi modules and 745.7 cm² for the SL-PCM filled modules. The sensible heat capacity of the modules was estimated based on the following equation:

$$q_{sensible} = [mC_p\ _{low\ temp}(T_{transformation} - T_{initial}) + mC_p\ _{high\ temp}(T_{final} - T_{transformation})]_{SL} + [mC_p(T_{final} - T_{initial})]_{SS} + [mC_p(T_{final} - T_{initial})]_{Al}, \quad (4)$$

where $q_{sensible}$ is the total sensible heat capacity (J), m is the mass of material (kg), $C_p$ is the specific heat (J/kgK), and T is the start, transformation, or final temperature of the material.

The latent heat capacity of the modules was estimated based on the following equation:

$$q_{latent} = [mL]_{SL} + [mL]_{SS} \quad (5)$$

where $q_{latent}$ (J) is the total latent heat of the module, m is the mass (g), and L is the latent heat (J/g). The total sensible and latent heat for a given module is simply the sum of Equations 4 and 5. Finally, the mass specific (kJ/kg) and volume specific (kJ/cm³) energy densities were estimated by dividing the module total energy storage by the module mass and volume, respectively.

TABLE 2

Parameters of Designs

| Description | System Designs using State of the Art Heat Exchanger Materials | | System Designs using SS MT PCMs according to Embodiments of the Present Invention | |
|---|---|---|---|---|
| | Al | Al & 1-Octadecanol | NiTi | NiTi & 1-Octadecanol |
| Total Volume (cm$^3$) | 187.5 | 187.5 | 187.5 | 167.5 |
| Total mass with PCM (g) | 202.2 | 235.4 | 537.7 | 570.9 |
| Heat transfer area (cm$^2$) | 1342.2 | 745.7 | 1342.2 | 745.7 |
| Mass PCM (g) SL/SS | 0/0 | 33.2/0 | 0/537.7 | 33.2/537.7 |
| Volume PCM (cm$^3$) SL/SS | 0/0 | 41/0 | 0/74.6 | 41/74.6 |
| PCM sensible heat capacity* (kJ) SL/SS | 0/0 | 5.6/0 | 0/16.4 | 5.6/16.4 |
| Module sensible heat capacity* (kJ) | 11.83 | 17.5 | 16.4 | 22.0 |
| Latent energy storage (kJ) SL/SS | 0/0 | 7.5/0 | 0/15.1 | 7.5/15.1 |
| Module sensible & latent storage (kJ) | 11.83 | 24.9 | 31.5 | 44.5 |
| Mass specific energy storage* (kJ/kg) | 58.5 | 105.7 | 58.6 | 78.0 |
| Volume specific energy storage* (kJ/cm$^3$) | 0.083 | 0.133 | 0.158 | 0.238 |

As shown in Table 2, it is anticipated that the solid-state NiTi (31.5 kJ) module will offer 1.27 and 2.66 times higher total energy storage than the aluminum/1-octadecanol (24.9 kJ) and the pure aluminum (11.8 kJ) modules, respectively. The composite NiTi/1-octadecanol module (44.5 kJ) is expected to provide 1.79 and 3.76 times higher total energy storage over the same corresponding modules. Clearly, these predicted improvements are a direct result of the use of NiTi (solid-solid transformation material) instead of aluminum, which has both higher sensible heat capacity (16.4 kJ vs 11.8 kJ) and added latent heat capacity (15.1 kJ vs 0 kJ).

Figure 19:
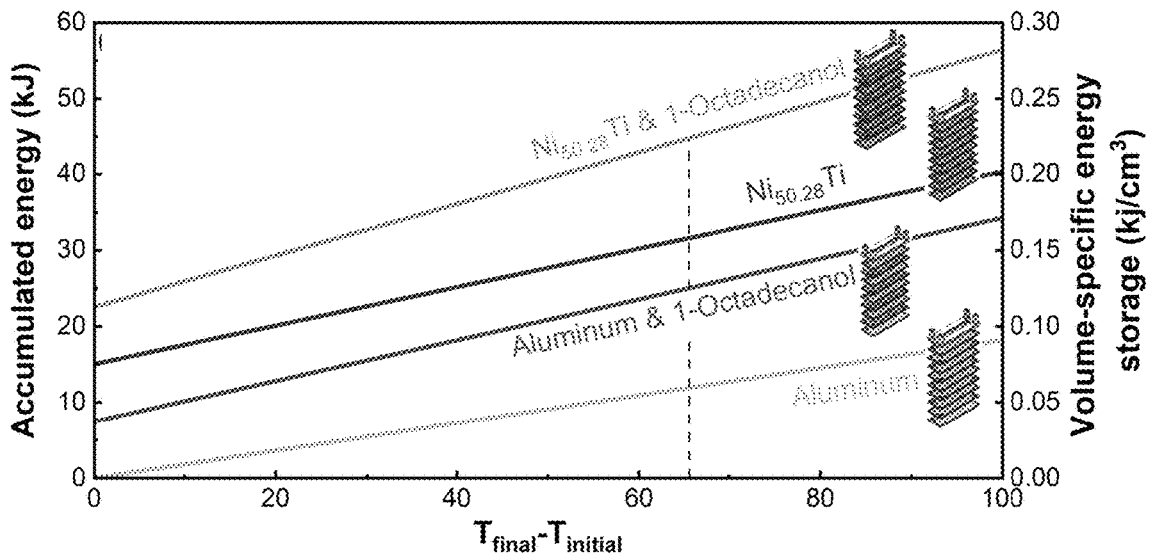
FIG. 19 is a plot of accumulated energy as a function of temperature change for understanding performance of the designs in FIGS. 18A-18D.

The above results are specific to a fixed $T_{final}-T_{initial}$ of 65° C. However, accumulated energy as a function of temperature (as shown in FIG. 19 and described by Equations 4-5) is useful for understanding performance through a range of operating conditions, which allows for extension into additional application spaces. The y-axis intercept on FIG. 19 represents the latent energy storage of each module. As such, the aluminum module starts at an intercept of zero, while the PCM-based module intercepts correspond with the total latent heat values in Table 2. The slope of the lines represent the specific heat capacity of the respective module. As shown in FIG. 19, the NiTi-based modules would always outperform the aluminum-based modules from a total energy and volume-specific energy standpoint for $T_{final}-T_{initial}$ values from 0 to 100° C.

It is worth noting that these relative performance numbers are specific to the mass and volume of material in our parallel-plate design and may not be fully representative of the benefits enabled by leveraging SS thermal energy storage materials. Additional studies to understand optimized solid-state and composite SS/SL energy storage modules should be performed. Nonetheless, this analysis shows that the modules tested here, and materials available in the literature, could provide benefit for a range of additional temperature ranges and are not exclusive to the specific operation point tested.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

We claim:

1. A heat exchange component comprising:
a part configured for exchanging thermal energy, said part formed of at least one solid state (SS) Martensitic transformation (MT) phase change material (PCM) which is configured to readily undergo a solid-solid martensitic transformation from one crystalline structure to another different crystalline structure during a change in temperature in the normal and/or anticipated operating temperatures of the heat exchange component and a transition between crystalline structures does not involve or result in physical deformation of the part; and
wherein the part is a heat exchange structure selected from the group consisting of: a heat spreader, a heat sink, a condenser, a radiator, a fin or fins, and a fluidic channel; and wherein the component is configured to exchange thermal energy with a thermal transfer fluid that is internal and/or external to the component.

2. The component of claim 1, wherein the one crystalline structure comprises one of B2, R-phase, B19, and B19' crystalline lattice and the another crystalline structure comprises another of B2, R-phase, B19, and B19' crystalline lattice.

3. The component of claim 1, wherein part comprises (i) one portion formed of a first SS MT PCM being configured to change crystalline structure at a first temperature, and (ii) at least another portion formed of a second SS MT PCM being configured to change crystalline structure at a second different temperature.

4. The component of claim 1, wherein the martensitic transformation is reversible.

5. The component of claim 1, wherein the part is fully or partially formed of SS MT PCM.

6. The component of claim 1, wherein the SS MT PCM comprises: a shape memory alloy (SMA), ceramic or other metal and/or alloy which readily undergoes a solid-solid martensitic transformation.

7. The component of claim 6, wherein the SMA comprises: a nickel-titanium-based alloy system, a copper-based alloy system, or a magnetic alloy system.

8. The component of claim 1, wherein the SS MT PCM has a Figure of Merit (FOM) of at least $15 \times 10^6$ $J^2/Ksm^4$.

9. The component of claim 1, wherein, through heating or melting, the thermal conductivity, transformation temperature and latent heat of the SS MT PCM are altered at least partially.

10. The component of claim 1, further configured to incorporate a solid-to-liquid or liquid-to-vapor/gas phase change material.

11. A thermal energy storage and/or heat transfer system comprising:
a temporally-evolving temperature source heat source; and
a component according to claim 1,
wherein the SS MT PCM of the component readily undergoes a solid-solid martensitic transformation from one crystalline structure to another different crystalline structure during a change in temperature in the normal and/or anticipated operating temperatures of the thermal energy storage and/or heat transfer system.

12. The system of claim 11, wherein the temporally-evolving temperature heat source comprises a solid conducting material, an electronic/photonic component, a fluid, a plasma, and/or a radiation source.

13. An electronic interconnect system comprising:
an electronic component which generates heat; and
a component according to claim 1 connected to said electronic component and configured to conduct electricity,
wherein the SS MT PCM of the component readily undergoes a solid-solid martensitic transformation from one crystalline structure to another different crystalline structure during a change in temperature in the normal and/or anticipated operating temperatures of the electronic interconnect system.

14. The electronic interconnect system according to claim 13, wherein the electronic component comprises one or more of: integrated circuits, chips, resistors, capacitors, inductors, diodes, transistors, transformers, fuses, and switches.

15. The electronic interconnect system according to claim 14, wherein the electronic component is configured as one or more of: junctions, metallic traces, wirebonds, and solder bonds.

16. A method of operating a heat exchange system comprising:
heating or cooling a component according to claim 1 to allow the SS MT PCM of the component to readily undergo a solid-solid martensitic transformation from one crystalline structure to another different crystalline structure during a change in temperature in the normal and/or anticipated operating temperatures of the heat exchange system.

17. A method of lowering the operational temperature of a component in a system which stores and/or transfers heats, the method comprising:
substituting a component in the system with a component according to claim 1,
wherein the SS MT PCM of the component readily undergoes a solid-solid martensitic transformation from one crystalline structure to another different crystalline structure during a change in temperature in the normal and/or anticipated operating temperatures of the thermal energy storage and/or heat transfer system so as to lower the operational temperature of the component in the system compared to the substituted component.

18. A method of increasing the time of use of a component in a system which stores and/or transfers heats, the method comprising:
substituting a component in the system with a component according to claim 1,
wherein the SS MT PCM of the component readily undergoes a solid-solid martensitic transformation from one crystalline structure to another different crystalline structure during a change in temperature in the normal and/or anticipated operating temperatures of the thermal energy storage and/or heat transfer system so as to increase the time of use of the component in the system compared to the substituted component.

19. A method of designing a component formed of a solid state (SS) Martensitic transformation (MT) phase change material (PCM) which readily undergoes a solid-solid phase change during normal and/or anticipated operating temperatures component in a system which stores and/or transfers heats, the method comprising:
identifying an application system which generates, stores or transfers heat;
identifying a component according to claim 1 to be used for the identified application system, wherein the SS MT PCM of the component is configured to readily undergo a solid-solid martensitic transformation from one crystalline structure to another different crystalline structure during a change in temperature in the normal and/or anticipated operating temperatures of the application system;
determining key parameters of the identified application system; and
optimizing said component for the identified application system based on the determined key parameters.

20. The method of claim 19, wherein determining key parameters comprises identifying one or more of: cycle speed, heat load, maximum and minimum temperature range, heat transfer media, size, weight constraints, and locations(s) for the component in the application system architecture.

21. A method a fabricating a heat exchange component comprising:
forming a component according to claim 1,
wherein the SS MT PCM of the fabricated component is configured to readily undergo a solid-solid martensitic transformation from one crystalline structure to another different crystalline structure during a change in temperature in the normal and/or anticipated operating temperatures of the heat exchange component.

22. The method of claim 21, further comprising: heating or melting the SS MT PCM to alter its thermal conductivity, transformation temperature and latent heat at least partially.

23. The method of claim 22, wherein the heating or melting is performed using with a laser.

24. The component of claim 6, wherein the SS MT PCM is selected from the materials listed in Table 1 of the Specification.

* * * * *